US012281284B2

(12) United States Patent
Fossum et al.

(10) Patent No.: US 12,281,284 B2
(45) **Date of Patent: *Apr. 22, 2025**

(54) PARTICULATE FABRIC CARE COMPOSITION

(71) Applicant: The Procter & Gamble Company, Cincinnati, OH (US)

(72) Inventors: Renae Dianna Fossum, Middletown, OH (US); Lidiany Gonzalez, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 611 days.

This patent is subject to a terminal disclaimer.

(21) Appl. No.: 17/512,240

(22) Filed: Oct. 27, 2021

(65) Prior Publication Data

US 2022/0049191 A1 Feb. 17, 2022

Related U.S. Application Data

(63) Continuation of application No. 16/722,492, filed on Dec. 20, 2019, now Pat. No. 11,186,805.

(51) Int. Cl.

| | |
|---|---|
| ***C11D 17/06*** | (2006.01) |
| ***C11D 3/20*** | (2006.01) |
| ***C11D 3/30*** | (2006.01) |
| ***C11D 3/37*** | (2006.01) |
| ***C11D 3/386*** | (2006.01) |
| ***C11D 3/50*** | (2006.01) |
| ***C11D 17/00*** | (2006.01) |

(52) U.S. Cl.

CPC .......... *C11D 3/3707* (2013.01); *C11D 3/2093* (2013.01); *C11D 3/30* (2013.01); *C11D 3/3746* (2013.01); *C11D 3/386* (2013.01); *C11D 3/50* (2013.01); *C11D 17/0008* (2013.01); *C11D 2111/12* (2024.01)

(58) Field of Classification Search

None

See application file for complete search history.

(56) References Cited

U.S. PATENT DOCUMENTS

| | | | |
|---|---|---|---|
| 4,464,281 | A | 8/1984 | Rapisarda |
| 4,746,456 | A | 5/1988 | Kud et al. |
| 4,846,994 | A | 7/1989 | Kud |
| 4,846,995 | A | 7/1989 | Kud et al. |
| 4,904,408 | A | 2/1990 | Kud et al. |
| 5,049,302 | A | 9/1991 | Holland |
| 5,500,154 | A | 3/1996 | Bacon et al. |
| 5,780,404 | A | 7/1998 | Bacon |
| 5,911,979 | A | 6/1999 | Midha |
| 6,703,008 | B2 | 3/2004 | Carballada |
| 8,143,209 | B2 | 3/2012 | Boeckh |
| 8,227,381 | B2 | 7/2012 | Rodrigues et al. |
| 8,247,368 | B2 | 8/2012 | Danziger |
| 8,497,234 | B2 | 7/2013 | Mayer et al. |
| 8,519,060 | B2 | 8/2013 | Boeckh |
| 8,716,208 | B2 | 5/2014 | Meek |
| 8,859,484 | B2 | 10/2014 | Hulskotter et al. |
| 9,528,076 | B2 | 12/2016 | Labeque |
| 9,850,452 | B2 | 12/2017 | Fossum et al. |
| 11,186,805 | B2 | 11/2021 | Fossum et al. |
| 11,326,129 | B2 | 5/2022 | Fossum et al. |
| 11,891,589 | B2 | 2/2024 | Fossum |
| 2002/0010105 | A1 | 1/2002 | Bacon et al. |
| 2003/0095944 | A1 | 5/2003 | Midha |
| 2003/0186833 | A1 | 10/2003 | Huff |
| 2005/0273942 | A1 | 12/2005 | Ferguson et al. |
| 2005/0273943 | A1 | 12/2005 | Hunter |
| 2005/0273944 | A1 | 12/2005 | Ferguson et al. |
| 2005/0277563 | A1 | 12/2005 | Ferguson et al. |
| 2006/0270582 | A1 | 11/2006 | Boeckh et al. |
| 2007/0089244 | A1 | 4/2007 | Penninger |
| 2007/0281879 | A1 | 12/2007 | Sharma |
| 2008/0045441 | A1 | 2/2008 | Schmiedel |
| 2008/0300158 | A1 | 12/2008 | Schutz |
| 2009/0081755 | A1 | 3/2009 | Schmiedel et al. |
| 2009/0312222 | A1 | 12/2009 | Ferguson et al. |

(Continued)

FOREIGN PATENT DOCUMENTS

| | | | |
|---|---|---|---|
| AU | 3714200 | A | 9/2000 |
| CA | 2329235 | A1 | 11/1999 |

(Continued)

OTHER PUBLICATIONS

PCT Search Report and Written Opinion for PCT/US2019/035493 dated Aug. 14, 2019.

PCT Search Report and Written Opinion for PCT/US2020/070919 dated Apr. 8, 2021.

PCT Search Report and Written Opinion for PCT/US2020/070920 dated May 3, 2021.

All Office Actions, U.S. Appl. No. 16/722,492, filed Dec. 20, 2019.

All Office Actions; U.S. Appl. No. 16/018,235, filed Jun. 26, 2018.

All Office Actions; U.S. Appl. No. 17/126,215, filed Dec. 18, 2020.

All Office Actions; U.S. Appl. No. 17/717,173, filed Apr. 11, 2022.

All Office Actions; U.S. Appl. No. 17/846,336, filed Jun. 22, 2022.

All Office Actions; U.S. Appl. No. 17/847,488, filed Jun. 23, 2022.

All Office Actions; U.S. Appl. No. 18/312,623, filed May 5, 2023.

All Office Actions; U.S. Appl. No. 18/321,834, filed May 23, 2023.

All Office Actions; U.S. Appl. No. 18/326,100, filed May 31, 2023.

(Continued)

*Primary Examiner* — Lorna M Douyon

(74) *Attorney, Agent, or Firm* — Gary J. Foose; Carolyn S. Powell

(57) ABSTRACT

A composition including a plurality of particles, wherein the particles include: about 25% to about 99% by weight a water soluble carrier; and about 1% to about 75% by weight a graft copolymer; wherein the graft copolymer includes: (a) a polyalkylene oxide which has a number average molecular weight of from about 1000 to about 20,000 Da and is based on ethylene oxide, propylene oxide, or butylene oxide; (b) N-vinylpyrrolidone; and (c) vinyl ester derived from a saturated monocarboxylic acid containing from 1 to 6 carbon atoms; wherein each of the particles has a mass from about 1 mg to about 1 g.

20 Claims, No Drawings

(56) References Cited

U.S. PATENT DOCUMENTS

| | | | | |
|---|---|---|---|---|
| 2010/0004154 | A1 | 1/2010 | Detering et al. | |
| 2010/0144958 | A1 | 6/2010 | Findlay et al. | |
| 2010/0197550 | A1 | 8/2010 | Bettiol | |
| 2010/0216684 | A1 | 8/2010 | Ferguson | |
| 2011/0107524 | A1* | 5/2011 | Chieffi | C11D 3/2044 510/513 |
| 2011/0143990 | A1 | 6/2011 | Boutique | |
| 2011/0152161 | A1 | 6/2011 | Murkunde | |
| 2011/0260101 | A1 | 10/2011 | Rittig | |
| 2012/0036651 | A1 | 2/2012 | Frankenbach | |
| 2012/0227196 | A1 | 9/2012 | Mukherjee | |
| 2013/0150277 | A1 | 6/2013 | Fischer et al. | |
| 2013/0296218 | A1 | 11/2013 | Wang et al. | |
| 2013/0326824 | A1 | 12/2013 | Somerville et al. | |
| 2015/0111285 | A1 | 4/2015 | Raja Abdul Rahman | |
| 2015/0203795 | A1 | 7/2015 | Miracle | |
| 2015/0203796 | A1 | 7/2015 | Miracle | |
| 2016/0010032 | A1 | 1/2016 | Tan et al. | |
| 2016/0090551 | A1 | 3/2016 | Fossum et al. | |
| 2016/0319225 | A1 | 11/2016 | Lant et al. | |
| 2016/0348037 | A1 | 12/2016 | Findlay et al. | |
| 2016/0362644 | A1 | 12/2016 | Meine et al. | |
| 2017/0009402 | A1 | 1/2017 | Mohammadi et al. | |
| 2018/0037848 | A1 | 2/2018 | Schubert | |
| 2019/0048297 | A1 | 2/2019 | Van Elsen et al. | |
| 2019/0169533 | A1 | 6/2019 | Zerhusen et al. | |
| 2019/0169777 | A1 | 6/2019 | Zerhusen et al. | |
| 2019/0390142 | A1 | 12/2019 | Fossum | |
| 2020/0369986 | A1 | 11/2020 | Hulskotter | |
| 2021/0189293 | A1 | 6/2021 | Fossum et al. | |
| 2021/0189294 | A1 | 6/2021 | Fossum et al. | |
| 2022/0056380 | A1 | 2/2022 | Fossum | |
| 2022/0235294 | A1 | 7/2022 | Fossum et al. | |
| 2022/0411718 | A1 | 12/2022 | Adriaenssens et al. | |
| 2022/0411722 | A1 | 12/2022 | Barbero et al. | |
| 2023/0002702 | A1 | 1/2023 | Barbero et al. | |
| 2024/0010954 | A1 | 1/2024 | Tang | |

FOREIGN PATENT DOCUMENTS

| | | | |
|---|---|---|---|
| CN | 103922944 | A | 7/2014 |
| DE | 202006019521 | U1 | 3/2007 |
| EP | 0285038 | A2 | 10/1988 |
| EP | 0330345 | B1 | 5/1995 |
| EP | 1072673 | A2 | 1/2001 |
| EP | 2009175 | A2 | 12/2008 |
| EP | 3330345 | A1 | 6/2018 |
| EP | 3330348 | A1 | 6/2018 |
| EP | 3126478 | B1 | 9/2018 |
| EP | 3375854 | A1 | 9/2018 |
| JP | 2001106743 | A | 4/2001 |
| JP | 2003505551 | A | 2/2003 |
| JP | 2004507610 | A | 3/2004 |
| JP | 2007534816 | A | 11/2007 |
| JP | 2008138014 | A | 6/2008 |
| JP | 2009542837 | A | 12/2009 |
| JP | 2010513640 | A | 4/2010 |
| JP | 2017526788 | A | 9/2017 |
| JP | 2017529432 | A | 10/2017 |
| JP | 2018510975 | A | 4/2018 |
| JP | 2018090796 | A | 6/2018 |
| JP | 2018522976 | A | 8/2018 |
| JP | 2018528281 | A | 9/2018 |
| JP | 2018536058 | A | 12/2018 |
| JP | 2019532124 | A | 11/2019 |
| WO | 9731094 | A1 | 8/1997 |
| WO | 9922697 | A1 | 5/1999 |
| WO | 2002005766 | A2 | 1/2002 |
| WO | 0219976 | A1 | 3/2002 |
| WO | 2009077255 | A1 | 6/2009 |
| WO | 2009095823 | A1 | 8/2009 |
| WO | 2011075426 | A1 | 6/2011 |
| WO | 2012004134 | A1 | 1/2012 |
| WO | 2018055114 | A1 | 3/2018 |
| WO | 2019075230 | A1 | 4/2019 |
| WO | 2019108714 | A1 | 6/2019 |
| WO | 2020005476 | A1 | 1/2020 |
| WO | 2020237258 | A1 | 11/2020 |
| WO | 2021067984 | A1 | 4/2021 |
| WO | 2021127697 | A1 | 6/2021 |
| WO | 2023017061 | A1 | 2/2023 |

OTHER PUBLICATIONS

All Office Actions; U.S. Appl. No. 18/326,089, filed May 31, 2023.

Unpublished U.S. Appl. No. 18/312,623, filed May 5, 2023 to Ming Tang et al.

Unpublished U.S. Appl. No. 18/326,100, filed May 31, 2023 to Giulia Ottavia Bianchetti et al.

Unpublished U.S. Appl. No. 18/326,089, filed May 31, 2023 to Ming Tang et al.

* cited by examiner

PARTICULATE FABRIC CARE COMPOSITION

FIELD OF THE INVENTION

Through the wash laundry care additive.

BACKGROUND OF THE INVENTION

Consumers typically launder loads of laundry that include cellulosic fiber containing articles that have colors that differ from one another. Such mixed colors loads can be susceptible to dye transfer amongst the laundered articles. The textile industry typically employs reactive dyes that are covalently bound to the cellulose fiber that result in better wash fastness as compared to direct dyes that have been employed in the past.

Although reactive dyes are comparatively more substantive to fabrics than direct dyes, reactive dyes can hydrolyze during the application process and that the hydrolyzed reactive dyes can be released into a wash liquor. As much as 50% hydrolysis can occur during the dyeing process, resulting in hydrolyzed reactive dyes that are slowly released over successive washing cycles. Thus, there remains a problem of fugitive dye transfer during the wash, even when reactive dyes are employed to dye articles.

As part of an overall fabric care process, consumers not only want to reduce the effects of dye transfer on the color of their articles but also want to provide for other fabric care benefits such as fabric softness and removal of deposits of skin oils from articles.

With this limitation in mind, there is a continuing unaddressed need for stable fabric care compositions that can inhibit dye transfer of hydrolyzed reactive dyes during washing and optionally provide additional fabric care benefits.

SUMMARY OF THE INVENTION

A composition comprising a plurality of particles, wherein the particles comprise: about 25% to about 99% by weight a water soluble carrier; and about 1% to about 75% by weight a graft copolymer; wherein the graft copolymer comprises: (a) a polyalkylene oxide which has a number average molecular weight of from about 1000 to about 20000 Da and is based on ethylene oxide, propylene oxide, or butylene oxide; (b) N-vinylpyrrolidone; and (c) vinyl ester derived from a saturated monocarboxylic acid containing from 1 to 6 carbon atoms; wherein (a) and (b) are present at a weight ratio of (a):(b) of from about 1:0.1 to about 1:1; wherein by weight, (a) is present in an amount greater than (c); wherein order of addition of (b) and (c) in graft polymerization is immaterial; and wherein each of the particles has a mass from about 1 mg to about 1 g.

DETAILED DESCRIPTION OF THE INVENTION

The composition described herein can provide for a through the wash particulate fabric care composition that is convenient for the consumer to dose to the washing machine. The through the wash particulate fabric care composition can be provided in a composition comprising particles. The particles described herein can be water soluble particles. The particles can be provided in a container that is separate from the package of detergent composition. Providing the particulate fabric care composition particles in a container separate from the package of detergent composition can be beneficial since it allows the consumer to select the amount of fabric care composition independent of the amount of detergent composition used. This can give the consumer the opportunity to customize the amount of fabric care composition used and thereby the amount of fabric care benefit they achieve, which is a highly valuable consumer benefit.

Particulate products, especially particulates that are not dusty, are preferred by many consumers. Particulate products can be easily dosed by consumers from a package directly into the washing machine or into a dosing compartment on the washing machine. Or the consumer can dose from the package into a dosing cup that optionally provides one or more dosing indicia and then dose the particulates into a dosing compartment on the washing machine or directly to the drum. For products in which a dosing cup is employed, particulate products tend to be less messy than liquid products.

The composition can comprise a plurality of particles. The particles can comprise about 25% to about 99% (optionally about 35% to about 99%) by weight a water soluble carrier; and about 1% to about 75% (optionally about 1% to about 50%) by weight a graft copolymer; wherein the graft copolymer comprises: (a) a polyalkylene oxide which has a number average molecular weight of from about 1000 to about 20000 Da and is based on ethylene oxide, propylene oxide, or butylene oxide; (b) N-vinylpyrrolidone; and (c) vinyl ester derived from a saturated monocarboxylic acid containing from 1 to 6 carbon atoms; wherein (a) and (b) are present at a weight ratio of (a):(b) of from about 1:0.1 to about 1:1; wherein by weight, (a) is present in an amount greater than (c); wherein order of addition of monomers (b) and (c) in graft polymerization is immaterial; and wherein each of the particles has a mass from about 1 mg to about 1 g.

The polyalkylene oxide in the graft copolymer can be based on ethylene oxide. The polyalkylene oxide in the graft copolymer can have a number average molecular weight of from about 1000 to about 20000 Da. The vinyl ester can be derived from a saturated monocarboxylic acid containing from 1 to 3 carbon atoms. The vinyl ester can be vinyl acetate or a derivative thereof. Parts (a) and (b) can be present at a weight ratio of (a):(b) of from about 1:0.2 to about 1:0.7. Parts (a) and (c) can be present at a weight ratio of (a):(c) of from about 1:0.1 to about 1:0.8. Parts (b) and (c) can be present at a weight ratio of (b):(c) of from about 1:0.1 to about 1:4. About 1 mol % to about 60 mol % of component (c) can be hydrolyzed. Hydrolyzing the graft copolymer makes the graft copolymer hydrophilic and is thought to make it more likely that the graft copolymer remains suspended in the wash liquor as opposed to being attracted to the hydrophobic fabric surface that is being washed. The number of grafting sites of the graft copolymer can be equal to or less than about 1 per 50 ethylene oxide groups.

The composition can further comprise about 5% to about 45% by weight a quaternary ammonium compound, optionally the quaternary ammonium compound can be formed from a parent fatty acid compound having an Iodine Value from about 18 to about 60. The quaternary ammonium compound can be provided in the same particles as the water soluble carrier and the graft copolymer. Optionally, the quaternary ammonium compound can be provided in adjunct particles distinct from the particles that comprise the water soluble carrier and the graft copolymer. A quaternary ammonium compound can provide for a softness benefit to the laundry. A quaternary ammonium compound can also protect clothing from damage by abrasion during the wash process.

The composition can further comprise from about 0.5% to about 10% by weight cationic polymer. The cationic polymer can be a synthetic polymer. Alternatively, the cationic polymer can be a cationic polysaccharide. The cationic polymer can be provided in adjunct particles distinct from the particles that comprise the water soluble carrier and the graft copolymer. Optionally, the cationic polymer can be provided in the same particles as the water soluble carrier and graft copolymer. The cationic polymer can be used to deposit benefit agents such as the quaternary ammonium compound, encapsulated or unencapsulated perfume.

Likewise, the composition can further comprise an acid. The acid can be provided in adjunct particles distinct from the particles that comprise the water soluble carrier and the graft copolymer. The acid can be an organic acid, including citric acid. The acid can be provided in the same particles as the water soluble carrier and the graft copolymer. Acid can help to sequester hardness ions in the wash liquor and help to help support maintaining dyes in suspension.

Similarly, the composition can further comprise a perfume. The perfume can be provided in adjunct particles distinct from the particles that comprise the water soluble carrier and the graft copolymer. The perfume can be provided as unencapsulated perfume, encapsulated perfume, or combinations thereof. The perfume can be provided in the same particles as the water soluble carrier and graft copolymer. The perfume can be transferred to the laundry during the wash to provide a scent to the laundry.

The composition can also comprise an enzyme. The enzyme can be provided in adjunct particles distinct from the particles that comprise the water soluble carrier and the graft copolymer. Optionally, the enzyme can be provided in the same particles as the water soluble carrier and graft copolymer. The enzyme can be selected from the group consisting of xyloglucanase, mannanase, a combinations thereof. The combination of the graft copolymer and enzyme is thought to reduce dye redeposition on fabrics and to remove sebum from fabrics.

The water soluble carrier can be selected from the group consisting of polyethylene glycol, polypropylene glycol, polyethylene glycol-co-polypropylene glycol, sodium acetate, sodium bicarbonate, sodium chloride, sodium silicate, polypropylene glycol polyoxoalkylene, polyethylene glycol fatty acid ester, polyethylene glycol ether, polyglycerol esters, sodium sulfate, carbohydrates, starch, and mixtures thereof. The water soluble carrier can comprise polyethylene glycol having a weight average molecular weight from about 2000 to about 20000 Da.

The particles can be less than about 10% by weight water. Such low water content particles can have improved physical and chemical stability.

The particles can be used in a process for treating laundry. The steps of the process can include providing a container containing the composition, dispensing from the container from 3 g to about 200 g of the composition from the container into a dosing device that is a closure of the container or into a dosing device that is engageable and disengageable with the container Water Soluble Carrier The particles can comprise a water soluble carrier. The water soluble carrier acts to carry the fabric care benefit agents to the wash liquor. Upon dissolution of the water soluble carrier, the fabric care benefit agents are dispersed into the wash liquor.

The water soluble carrier can be a material that is soluble in a wash liquor within a short period of time, for instance less than about 10 minutes. The water soluble carrier can be selected from the group consisting of water soluble inorganic alkali metal salt, water-soluble alkaline earth metal salt, water-soluble organic alkali metal salt, water-soluble organic alkaline earth metal salt, water soluble carbohydrate, water-soluble silicate, water soluble urea, and any combination thereof.

Alkali metal salts can be, for example, selected from the group consisting of salts of lithium, salts of sodium, and salts of potassium, and any combination thereof. Useful alkali metal salts can be, for example, selected from the group consisting of alkali metal fluorides, alkali metal chlorides, alkali metal bromides, alkali metal iodides, alkali metal sulfates, alkali metal bisulfates, alkali metal phosphates, alkali metal monohydrogen phosphates, alkali metal dihydrogen phosphates, alkali metal carbonates, alkali metal monohydrogen carbonates, alkali metal acetates, alkali metal citrates, alkali metal lactates, alkali metal pyruvates, alkali metal silicates, alkali metal ascorbates, and combinations thereof.

Alkali metal salts can be selected from the group consisting of sodium fluoride, sodium chloride, sodium bromide, sodium iodide, sodium sulfate, sodium bisulfate, sodium phosphate, sodium monohydrogen phosphate, sodium dihydrogen phosphate, sodium carbonate, sodium hydrogen carbonate, sodium acetate, sodium citrate, sodium lactate, sodium tartrate, sodium silicate, sodium ascorbate, potassium fluoride, potassium chloride, potassium bromide, potassium iodide, potassium sulfate, potassium bisulfate, potassium phosphate, potassium monohydrogen phosphate, potassium dihydrogen phosphate, potassium carbonate, potassium monohydrogen carbonate, potassium acetate, potassium citrate, potassium lactate, potassium tartrate, potassium silicate, potassium, ascorbate, and combinations thereof.

Alkaline earth metal salts can be selected from the group consisting of salts of magnesium, salts of calcium, and the like, and combinations thereof. Alkaline earth metal salts can be selected from the group consisting of alkaline metal fluorides, alkaline metal chlorides, alkaline metal bromides, alkaline metal iodides, alkaline metal sulfates, alkaline metal bisulfates, alkaline metal phosphates, alkaline metal monohydrogen phosphates, alkaline metal dihydrogen phosphates, alkaline metal carbonates, alkaline metal monohydrogen carbonates, alkaline metal acetates, alkaline metal citrates, alkaline metal lactates, alkaline metal pyruvates, alkaline metal silicates, alkaline metal ascorbates, and combinations thereof. Alkaline earth metal salts can be selected from the group consisting of magnesium fluoride, magnesium chloride, magnesium bromide, magnesium iodide, magnesium sulfate, magnesium phosphate, magnesium monohydrogen phosphate, magnesium dihydrogen phosphate, magnesium carbonate, magnesium monohydrogen carbonate, magnesium acetate, magnesium citrate, magnesium lactate, magnesium tartrate, magnesium silicate, magnesium ascorbate, calcium fluoride, calcium chloride, calcium bromide, calcium iodide, calcium sulfate, calcium phosphate, calcium monohydrogen phosphate, calcium dihydrogen phosphate, calcium carbonate, calcium monohydrogen carbonate, calcium acetate, calcium citrate, calcium lactate, calcium tartrate, calcium silicate, calcium ascorbate, and combinations thereof.

Inorganic salts, such as inorganic alkali metal salts and inorganic alkaline earth metal salts, do not contain carbon. Organic salts, such as organic alkali metal salts and organic alkaline earth metal salts, contain carbon. The organic salt can be an alkali metal salt or an alkaline earth metal salt of sorbic acid (i.e., asorbate). Sorbates can be selected from the group consisting of sodium sorbate, potassium sorbate, magnesium sorbate, calcium sorbate, and combinations thereof.

The water soluble carrier can be or comprise a material selected from the group consisting of a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, and combinations thereof. The water soluble carrier can be selected from the group consisting of sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate, water glass, sodium silicate, potassium silicate, dextrose, fructose, galactose, isoglucose, glucose, sucrose, raffinose, isomalt, xylitol, candy sugar, coarse sugar, and combinations thereof. In one embodiment, the water soluble carrier can be sodium chloride. In one embodiment, the water soluble carrier can be table salt.

The water soluble carrier can be or comprise a material selected from the group consisting of sodium bicarbonate, sodium sulfate, sodium carbonate, sodium formate, calcium formate, sodium chloride, sucrose, maltodextrin, corn syrup solids, corn starch, wheat starch, rice starch, potato starch, tapioca starch, clay, silicate, citric acid carboxymethyl cellulose, fatty acid, fatty alcohol, glyceryl diester of hydrogenated tallow, glycerol, and combinations thereof.

The water soluble carrier can be selected from the group consisting of water soluble organic alkali metal salt, water soluble inorganic alkaline earth metal salt, water soluble organic alkaline earth metal salt, water soluble carbohydrate, water soluble silicate, water soluble urea, starch, clay, water insoluble silicate, citric acid carboxymethyl cellulose, fatty acid, fatty alcohol, glyceryl diester of hydrogenated tallow, glycerol, polyethylene glycol, and combinations thereof.

The water soluble carrier can be selected from the group consisting of disaccharides, polysaccharides, silicates, zeolites, carbonates, sulfates, citrates, and combinations thereof.

The water soluble carrier can be a water soluble polymer. Water soluble polymers can be selected from the group consisting of polyvinyl alcohols (PVA), modified PVAs; polyvinyl pyrrolidone; PVA copolymers such as PVA/polyvinyl pyrrolidone and PVA/polyvinyl amine; partially hydrolyzed polyvinyl acetate; polyalkylene oxides such as polyethylene oxide; polyethylene glycols; polypropylene glycol, polyglycerol esters, acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch; gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof. In one embodiment the polymer comprises polyacrylates, especially sulfonated polyacrylates and water-soluble acrylate copolymers; and alkylhydroxy cellulosics such as methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates. In yet another embodiment the water soluble polymer can be selected from the group consisting of PVA; PVA copolymers; hydroxypropyl methyl cellulose (HPMC); and mixtures thereof.

The water soluble carrier can be selected from the group consisting of polyvinyl alcohol, modified polyvinyl alcohol, polyvinyl pyrrolidone, polyvinyl alcohol/polyvinyl pyrrolidone, polyvinyl alcohol/polyvinyl amine, partially hydrolyzed polyvinyl acetate, polyalkylene oxide, polyethylene glycol, polypropylene glycol, polyethylene-co-polypropylene glycol, polyglycerol esters, acrylamide, acrylic acid, cellulose, alkyl cellulosics, methyl cellulose, ethyl cellulose, propyl cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides, starch, modified starch, gelatin, alginates, xyloglucans, hemicellulosic polysaccharides, xylan, glucuronoxylan, arabinoxylan, mannan, glucomannan, galactoglucomannan, natural gums, pectin, xanthan, carrageenan, locus bean, arabic, tragacanth, polyacrylates, sulfonated polyacrylates, water-soluble acrylate copolymers, alkylhydroxy cellulosics, methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates, polyvinyl alcohol copolymers, hydroxypropyl methyl cellulose, and mixtures thereof.

The water soluble carrier can be an organic material. Organic water soluble carriers may provide a benefit of being readily soluble in water.

The water soluble carrier can be selected from the group consisting of polyalkylene oxide, polyethylene glycol, sodium acetate, sodium bicarbonate, sodium chloride, sodium silicate, polypropylene glycol, polyethylene glycol-co-polypropylene glycol, polyglycerol esters, polyoxoalkylene, polyethylene glycol fatty acid ester, polyethylene glycol ether, polyglycerol esters, sodium sulfate, carbohydrates, starch, and mixtures thereof.

The water soluble carrier can be polyethylene glycol (PEG). PEG can be a convenient material to employ to make particles because it can be sufficiently water soluble to dissolve during a wash cycle when the particles have the range of mass disclosed herein. Further, PEG can be easily processed as melt. The onset of melt temperature of PEG can vary as a function of molecular weight of the PEG. The particles can comprise about 25% to about 99% by weight PEG having a weight average molecular weight from about 2000 to about 20000 Da. PEG has a relatively low cost, may be formed into many different shapes and sizes, minimizes unencapsulated perfume diffusion, and dissolves well in water. PEG comes in various weight average molecular weights. A suitable weight average molecular weight range of PEG includes from about 2,000 to about 20,000 Da, optionally from about 2000 to about 13000 Da, alternatively from about 4,000 to about 20,000 Da, alternatively from about 4,000 to about 12,000 Da, alternatively from about 4,000 to about 11,000 Da, alternatively from about 5,000 to about 11,000 Da, alternatively from about 6,000 to about 10,000 Da, alternatively from about 7,000 to about 9,000 Da, alternatively combinations thereof.

The particles can comprise about 25% to about 99% by weight of the particles of PEG. Optionally, the particles can comprise from about 35% to about 99%, optionally from about 40% to about 99%, optionally from about 50% to about 99%, optionally combinations thereof and any whole percentages or ranges of whole percentages within any of the aforementioned ranges, of PEG by weight of the respective particles.

The water soluble carrier can comprise a material selected from the group consisting of: a polyalkylene oxide polymer of formula $H—(C_2H_4O)_x—(CH(CH_3)CH_2O)—(C_2H_4O)_z—OH$ wherein x is from about 50 to about 300, y is from about 20 to about 100, and z is from about 10 to about 200; a polyethylene glycol fatty acid ester of formula $(C_2H_4O)_q—C(O)O—(CH_2)_r—CH_3$ wherein q is from about 20 to about 200 and r is from about 10 to about 30; a polyethylene glycol fatty alcohol ether of formula $HO—(C_2H_4O)_s—(CH_2)_t)—CH_3$ wherein s is from about 30 to about 250 and t is from about 10 to about 30; and mixtures thereof. The polyalkylene oxide polymer of formula $H—(C_2H_4O)_x—(CH(CH_3)CH_2O)_y—(C_2H_4O)_z—OH$ wherein x is from about 50 to about 300, y is from about 20 to about 100, and z is from about 10 to about 200, can be a block copolymer or random copolymer.

The water soluble carrier can comprise: polyethylene glycol; a polyalkylene oxide polymer of formula $H—(C_2H_4O)_x—(CH(CH_3)CH_2O)_y—(C_2H_4O)_z—OH$ wherein x is from about 50 to about 300; y is from about 20 to about 100, and z is from about 10 to about 200; a polyethylene glycol fatty acid ester of formula $(C_2H_4O)_q—C(O)O—(CH_2)_r—CH_3$ wherein q is from about 20 to about 200 and r is from about 10 to about 30; and a polyethylene glycol fatty alcohol ether of formula $HO—(C_2H_4O)_s—(CH_2)_t)—CH_3$ wherein s is from about 30 to about 250 and t is from about 10 to about 30.

The water soluble carrier can comprise from about 20% to about 80% by weight of the particles of polyalkylene oxide polymer of formula $H—(C_2H_4O)_x—(CH(CH_3)CH_2O)_y—(C_2H_4O)_z—OH$ wherein x is from about 50 to about 300; y is from about 20 to about 100, and z is from about 10 to about 200.

The water soluble carrier can comprise from about 1% to about 20% by weight of the particles polyethylene glycol fatty acid ester of formula $(C_2H_4O)_q—C(O)O—(CH_2)_r—CH_3$ wherein q is from about 20 to about 200 and r is from about 10 to about 30.

The water soluble carrier can comprise from about 1% to about 10% by weight of the particles of polyethylene glycol fatty alcohol ether of formula $HO—(C_2H_4O)_s—(CH_2)_t—CH_3$ wherein s is from about 30 to about 250 and t is from about 10 to about 30.

Quaternary Ammonium Compound

The particles can comprise a quaternary ammonium compound so that the particles can provide a softening or lubrication benefit to laundered fabrics through the wash, and in particular during the wash sub-cycle of a washer having wash and rinse sub-cycles. Optionally, the quaternary ammonium compound can be provided as or in an adjunct particle.

The quaternary ammonium compound (quat) can be an ester quaternary ammonium compound. Suitable quaternary ammonium compounds include but are not limited to, materials selected from the group consisting of ester quats, amide quats, imidazoline quats, alkyl quats, amidoester quats and combinations thereof. Suitable ester quats include but are not limited to, materials selected from the group consisting of monoester quats, diester quats, triester quats and combinations thereof.

Without being bound by theory, it is thought that the cold water dissolution time of the particles that include a quaternary ammonium compound tends to decrease with increasing Iodine Value, recognizing that there is some variability with respect to this relationship.

The particles, or adjunct particles if provided, can comprise about 5% to about 45% by weight a quaternary ammonium compound. The quaternary ammonium compound can optionally have an Iodine Value from about 18 to about 60, optionally about 18 to about 56, optionally about 20 to about 60, optionally about 20 to about 56, optionally about 20 to about 42, and any whole numbers within the aforesaid ranges. Optionally the particles can comprise about 10% to about 40% by weight a quaternary ammonium compound, further optionally having any of the aforesaid ranges of Iodine Value. Optionally the particles can comprise about 20% to about 40% by weight a quaternary ammonium compound, further optionally having the aforesaid ranges of Iodine Value.

The quaternary ammonium compounds may be derived from fatty acids. The fatty acids may include saturated fatty acids and/or unsaturated fatty acids. The fatty acids may be characterized by an iodine value. The fatty acids may include an alkyl portion containing, on average by weight, from about 13 to about 22 carbon atoms, or from about 14 to about 20 carbon atoms, optionally from about 16 to about 18 carbon atoms. Suitable fatty acids may include those derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, etc.; (3) processed and/or bodied oils, such as linseed oil or tung oil via thermal, pressure, alkali-isomerization and catalytic treatments; (4) a mixture thereof, to yield saturated (e.g. stearic acid), unsaturated (e.g. oleic acid), polyunsaturated (linoleic acid), branched (e.g. isostearic acid) or cyclic (e.g. saturated or unsaturated α-disubstituted cyclopentyl or cyclohexyl derivatives of polyunsaturated acids) fatty acids.

The quaternary ammonium compound may comprise compounds formed from fatty acids that are unsaturated. The fatty acids may comprise unsaturated C18 chains, which may be include a single double bond ("C18:1") or may be double unsaturated ("C18:2"). The quaternary ammonium compound may be derived from fatty acids and optionally from triethanolamine, optionally unsaturated fatty acids that include eighteen carbons ("C18 fatty acids"), optionally C18 fatty acids that include a single double bone ("C18:1 fatty acids"). The quaternary ammonium compound may comprise from about 10% to about 95%, or from about 10% to about 90%, or from about 15% to about 80%, by weight of the quaternary ammonium compound, of compounds derived from triethanolamine and C18:1 fatty acids.

Suitable quaternary ammonium ester compounds may be derived from alkanolamines, for example, C1-C4 alkanolamines, optionally C2 alkanolamines (e.g., ethanolamines). The quaternary ammonium ester compounds may be derived from monoalkanolamines, dialkanolamines, trialkanolamines, or mixtures thereof, optionally monoethanolamines, diethanolamines, di-isopropanolamines, triethanolamines, or mixtures thereof. The alkanolamines from which the quaternary ammonium ester compounds are derived may be alkylated mono- or dialkanolamines, for example C1-C4 alkylated alkanolamines, optionally C1 alkylated alkanolamines (e.g, N-methyldiethanolamine).

The quaternary ammonium ester compound may comprise a quaternized nitrogen atom that is substituted, at least in part. The quaternized nitrogen atom may be substituted, at least in part, with one or more C1-C3 alkyl or C1-C3 hydroxyl alkyl groups. The quaternized nitrogen atom may be substituted, at least in part, with a moiety selected from the group consisting of methyl, ethyl, propyl, hydroxyethyl, 2-hydroxypropyl, 1-methyl-2-hydroxyethyl, poly($C_2$-$C_3$ alkoxy), polyethoxy, benzyl, optionally methyl or hydroxyethyl.

The quaternary ammonium ester compound may comprise compounds according to Formula (I):

$$\{R^2_{(4-m)}—N+-[X—Y—R^1]_m\}A^- \qquad \text{Formula (I)}$$

wherein:

m is 1, 2 or 3, with provisos that, in a given molecule, the value of each m is identical, and when (a) the quaternary ammonium ester compound comprises triester quaternary ammonium material ("triester quat"), for at least some of the compounds according to Formula (I), m is 3 (i.e., a triester);

each $R^1$, which may comprise from 13 to 22 carbon atoms, is independently a linear hydrocarbyl or branched hydrocarbyl group, optionally $R^1$ is linear, optionally $R^1$ is partially unsaturated linear alkyl chain;

each $R^2$ is independently a $C_1$-$C_3$ alkyl or hydroxyalkyl group and/or each $R^2$ is selected from methyl, ethyl, propyl, hydroxyethyl, 2-hydroxypropyl, 1-methyl-2-hydroxyethyl, poly($C_2$-$C_3$ alkoxy), polyethoxy, benzyl, optionally methyl or hydroxyethyl;

each X is independently —$(CH_2)$n-, —$CH_2$—CH($CH_3$)— or —CH($CH_3$)—$CH_2$—, where each n is independently 1, 2, 3 or 4, optionally each n is 2;

each Y is independently —O—(O)C— or —C(O)—O—; and

A− is independently selected from the group consisting of chloride, bromide, methyl sulfate, ethyl sulfate, sulfate, and nitrate, optionally A− is selected from the group consisting of chloride and methyl sulfate, optionally A− is methyl sulfate.

At least one X, optionally each X, may be independently selected from —$CH_2$—CH($CH_3$)— or —CH($CH_3$)—$CH_2$—. When m is 2, X may be selected from *—$CH_2$—CH($CH_3$)—, *—CH($CH_3$)—$CH_2$—, or a mixture thereof, where the * indicates the end nearest the nitrogen of the quaternary ammonium ester compound. When there are two or more X groups present in a single compound, at least two of the X groups may be different from each other. For example, when m is 2, one X (e.g., a first X) may be *—$CH_2$—CH($CH_3$)—, and the other X (e.g., a second X) may be *—CH($CH_3$)—$CH_2$—, where the * indicates the end nearest the nitrogen of the quaternary ammonium ester compound. It has been found that such selections of the m index and X groups can improve the hydrolytic stability of the quaternary ammonium ester compound, and hence further improve the stability of the composition.

For similar stability reasons, the quaternary ammonium ester compound may comprise a mixture of: bis-(2-hydroxypropyl)-dimethylammonium methylsulfate fatty acid ester; (2-hydroxypropyl)-(1-methyl-2-hydroxyethyl)-dimethylammonium methylsulfate fatty acid ester; and bis-(1-methyl-2-hydroxyethyl)-dimethylammonium methylsulfate fatty acid ester; where the fatty acid esters are produced from a C12-C18 fatty acid mixture. The quaternary ammonium ester compound may comprise any of the fatty acid esters, individually or as a mixture, listed in this paragraph.

Each X may be —$(CH_2)$n-, where each n is independently 1, 2, 3 or 4, optionally each n is 2.

Each $R^1$ group may correspond to, and/or be derived from, the alkyl portion(s) of any of the fatty acids provided above. The $R^1$ groups may comprise, by weight average, from about 13 to about 22 carbon atoms, or from about 14 to about 20 carbon atoms, optionally from about 16 to about 18 carbon atoms. It may be that when Y is *—O—(O)C— (where the * indicates the end nearest the X moiety), the sum of carbons in each $R^1$ is from 13 to 21, optionally from 13 to 19.

The quaternary ammonium compounds of the present disclosure may include a mixture of quaternary ammonium compounds according to Formula (I), for example, having some compounds where m=1 (e.g., monoesters) and some compounds where m=2 (e.g., diesters). Some mixtures may even contain compounds where m=3 (e.g., triesters). The quaternary ammonium compounds may include compounds according to Formula (I), where m is 1 or 2, but not 3 (e.g., is substantially free of triesters).

The quaternary ammonium compounds of the present disclosure may include compounds according to Formula (I), wherein each $R^2$ is a methyl group. The quaternary ammonium compounds of the present disclosure may include compounds according to Formula (I), wherein at least one $R^2$, optionally wherein at least one $R^2$ is a hydroxyethyl group and at least one $R^2$ is a methyl group. For compounds according to Formula (I), m may equal 1, and only one $R^2$ may be a hydroxyethyl group.

The quaternary ammonium compounds of the present disclosure may include methyl sulfate as a counterion. When the quaternary ammonium ester compounds of the present disclosure comprise compounds according to Formula (I), A− may optionally be methyl sulfate.

The quaternary ammonium compounds of the present disclosure may comprise one or members selected from the group consisting of:

(A) bis-(2-hydroxypropyl)-dimethylammonium methylsulfate fatty acid ester and isomers of bis-(2-hydroxypropyl)-dimethylammonium methylsulfate fatty acid ester and/or mixtures thereof; N,N-bis-(2-(acyl-oxy)-propyl)-N,N-dimethylammonium methylsulfate and/or N-(2-(acyl-oxy)-propyl) N-(2-(acyl-oxy) 1-methyl-ethyl) N,N-dimethylammonium methylsulfate and/or mixtures thereof, in which the acyl moiety is derived from c12-c22 fatty acids such as Palm, Tallow, Canola and/or other suitable fatty acids, which can be fractionated and/or hydrogenated, and/or mixtures thereof;

(B) 1,2-di(acyloxy)-3-trimethylammoniopropane chloride in which the acyl moiety is derived from c12-c22 fatty acids such as Palm, Tallow, Canola and/or other suitable fatty acids, which can be fractionated and/or hydrogenated, and/or mixtures thereof;

(C) N,N-bis(hydroxyethyl)-N,N-dimethyl ammonium chloride fatty acid esters; N,N-bis(acyl-oxy-ethyl)-N,N-dimethyl ammonium chloride in which the acyl moiety is derived from C12-C22 fatty acids such as Palm, Tallow, Canola and/or other suitable fatty acids, which can be fractionated and/or hydrogenated, and/or mixtures thereof, such as N,N-bis (tallowoyl-oxy-ethyl) N,N-dimethyl ammonium chloride;

(D) esterification products of Fatty Acids with Triethanolamine, quaternized with Dimethyl Sulphate; N,N-bis(acyl-oxy-ethyl) N-(2-hydroxyethyl)-N-methyl ammonium methylsulfate in which the acyl moiety is derived from C12-C22 fatty acids such as Palm, Tallow, Canola and/or other suitable fatty acids, which can be fractionated and/or hydrogenated, and/or mixtures thereof, such as N,N-bis(tallowoyl-oxy-ethyl) N-(2-hydroxyethyl)-N-methyl ammonium methylsulfate;

(E) dicanoladimethylammonium chloride; di(hard)tallowdimethylammonium chloride; dicanoladimethylammonium methylsulfate; 1-methyl-1-stearoylamidoethyl-2-stearoylimidazolinium methylsulfate; 1-tallowylamidoethyl-2-tallowylimidazoline; dipalmylmethyl hydroxyethylammoinum methylsulfate; and/or (F) mixtures thereof.

Examples of suitable quaternary ammonium ester compound are commercially available from Evonik under the tradename REWOQUAT WE18 and/or REWOQUAT WE20, and from Stepan under the tradename STEPANTEX GA90, STEPANTEX VK90, and/or STEPANTEX VL90A.

It is understood that compositions that comprise a quaternary ammonium ester compound as a fabric conditioning active may further comprise non-quaternized derivatives of such compounds, as well as unreacted reactants (e.g., free fatty acids).

The quaternary ammonium compound can be that used as part of BOUNCE dryer sheets available from The Procter & Gamble Company, Cincinnati, Ohio, USA. The quaternary ammonium compound can be the reaction product of triethanolamine and partially hydrogenated tallow fatty acids quaternized with dimethyl sulfate.

It will be understood that combinations of quaternary ammonium compounds disclosed above are suitable for use in this invention.

The particles, or adjunct particles if used, can comprise from about 10 to about 40% by weight quaternary compound.

The iodine value of a quaternary ammonium compound is the iodine value of the parent fatty acid from which the compound is formed and is defined as the number of grams of iodine which react with 100 grams of parent fatty acid from which the compound is formed.

First, the quaternary ammonium compound is hydrolysed according to the following protocol: 25 g of quaternary ammonium compound is mixed with 50 mL of water and 0.3 mL of sodium hydroxide (50% activity). This mixture is boiled for at least an hour on a hotplate while avoiding that the mixture dries out. After an hour, the mixture is allowed to cool down and the pH is adjusted to neutral (pH between 6 and 8) with sulfuric acid 25% using pH strips or a calibrated pH electrode.

Next the fatty acid is extracted from the mixture via acidified liquid-liquid extraction with hexane or petroleum ether: the sample mixture is diluted with water/ethanol (1:1) to 160 mL in an extraction cylinder, 5 grams of sodium chloride, 0.3 mL of sulfuric acid (25% activity) and 50 mL of hexane are added. The cylinder is stoppered and shaken for at least 1 minute. Next, the cylinder is left to rest until 2 layers are formed. The top layer containing the fatty acid in hexane is transferred to another recipient. The hexane is then evaporated using a hotplate leaving behind the extracted fatty acid.

Next, the iodine value of the parent fatty acid from which the fabric conditioning active is formed is determined following ISO3961:2013. The method for calculating the iodine value of a parent fatty acid comprises dissolving a prescribed amount (from 0.1-3 g) into 15 mL of chloroform. The dissolved parent fatty acid is then reacted with 25 mL of iodine monochloride in acetic acid solution (0.1M). To this, 20 mL of 10% potassium iodide solution and 150 mL deionised water is added. After the addition of the halogen has taken place, the excess of iodine monochloride is determined by titration with sodium thiosulphate solution (0.1M) in the presence of a blue starch indicator powder. At the same time a blank is determined with the same quantity of reagents and under the same conditions. The difference between the volume of sodium thiosulphate used in the blank and that used in the reaction with the parent fatty acid enables the iodine value to be calculated.

Cationic Polymer

The particles can comprise a cationic polymer. Cationic polymers can provide the benefit of a deposition aid that helps to deposit, onto the fabric, quaternary ammonium compound and possibly some other benefit agents that are contained in the particles. Optionally, the cationic polymer can be provided as or in an adjunct particle.

The particles, or adjunct particles if used, can comprise about 0.5% to about 10% by weight cationic polymer. Optionally, the particles, or adjunct particles if used, can comprise about 0.5% to about 5% by weight cationic polymer, or even about 1% to about 5% by weight, or even about 2% to about 4% by weight cationic polymer, or even about 3% by weight cationic polymer. Without being bound by theory, it is thought that the cleaning performance of laundry detergent in the wash decreases with increasing levels of cationic polymer in the particles and acceptable cleaning performance of the detergent can be maintained within the aforesaid ranges. Non-limiting examples of cationic polymers are cationic or amphoteric, polysaccharides, proteins and synthetic polymers. Cationic polysaccharides include cationic cellulose derivatives, cationic guar gum derivatives, chitosan and its derivatives and cationic starches. Suitable cationic polysaccharides include cationic cellulose ethers, particularly cationic hydroxyethylcellulose and cationic hydroxypropylcellulose.

Cationic polymers including those with the INCI name Polyquaternium-4; Polyquaternium-6; Polyquaternium-7; Polyquaternium-10; Polyquaternium-22; Polyquaternium-67; and mixtures thereof can be suitable. Other suitable polysaccharides include hydroxyethyl cellulose or hydoxypropylcellulose quaternized with glycidyl $C_{12}$-$C_{22}$ alkyl dimethyl ammonium chloride. The cationic polymer can be cationic guar gum or cationic locust bean gum. An example of a cationic guar gum is a quaternary ammonium derivative of hydroxypropyl guar. In another aspect, the cationic polymer may be selected from the group consisting of cationic polysaccharides. In one aspect, the cationic polymer may be selected from the group consisting of cationic cellulose ethers, cationic galactomanan, cationic guar gum, cationic starch, and combinations thereof.

The cationic polymer can be provided in a powder form. The cationic polymer can be provided in an anhydrous state.

Fatty Acid

The particles can comprise fatty acid. Optionally, the fatty acid can be provided as or in an adjunct particle.

The term "fatty acid" is used herein in the broadest sense to include unprotonated or protonated forms of a fatty acid. One skilled in the art will readily appreciate that the pH of an aqueous composition will dictate, in part, whether a fatty acid is protonated or unprotonated. The fatty acid may be in its unprotonated, or salt form, together with a counter ion, such as, but not limited to, calcium, magnesium, sodium, potassium, and the like. The term "free fatty acid" means a fatty acid that is not bound to another chemical moiety (covalently or otherwise).

The fatty acid may include those containing from 12 to 25, from 13 to 22, or even from 16 to 20, total carbon atoms, with the fatty moiety containing from 10 to 22, from 12 to 18, or even from 14 (mid-cut) to 18 carbon atoms.

Mixtures of fatty acids from different fat sources can be used. Branched fatty acids such as isostearic acid are also suitable since they may be more stable with respect to oxidation and the resulting degradation of color and odor quality. The fatty acid may have an iodine value from 0 to 140, from 10 to 120, from 50 to 120 or even from 85 to 105.

The particles, or adjunct particles if used, can comprise from about 0% to about 40%, optionally from about 1% to about 40%, by weight fatty acid. The fatty acid can be selected from the group consisting of, a saturated fatty acids, unsaturated fatty acid, and mixtures thereof. The fatty acid can be a blend of saturated fatty acids, a blend of unsaturated fatty acids, and mixtures thereof. The fatty acid can be substituted or unsubstituted. The fatty acid can be provided with the quaternary ammonium compound. The fatty acid can have an Iodine Value of zero.

The fatty acid can be selected from the group consisting of stearic acid, palmitic acid, coconut oil, palm kernel oil, stearic acid palmitic acid blend, oleic acid, vegetable oil, partially hydrogenated vegetable oil, and mixtures thereof.

The fatty acid can be Stearic acid CAS No. 57-11-4. The fatty acid can be palmitic acid CAS No. 57-10-3. The fatty acid can be a blend of stearic acid and coconut oil. The fatty acid can be C12 to C22 fatty acid. C12 to C22 fatty acid can have tallow or vegetable origin, can be saturated or unsaturated, can be substituted or unsubstituted.

Without being bound by theory, fatty acid may help as a processing aid for uniformly mixing the formulation components of the particles.

Enzyme

The particles, and or adjunct particles is provided, can comprise an enzyme. Enzymes can provide improved cleaning performance and other fabric care benefits. Optionally, the enzyme can be provided as or in an adjunct particle. Enzyme can be selected from the group consisting of hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, and mixtures thereof. Suitable proteases may include metalloproteases and serine proteases, such as including neutral or alkaline microbial serine proteases, such as subtilisins (EC 3.4.21.62). The protease may be a trypsin-type or chymotrypsin-type protease. The protease may be of microbial origin, such as of bacterial origin or of fungal origin. The protease may be a chemically or genetically modified mutant or variant of a wild type. The enzyme can be selected from the group consisting of protease, xyloglucanase, mannanase, and combinations thereof. The combination of the graft copolymer and enzyme is thought to reduce dye redeposition on fabrics and to remove sebum from fabrics.

Graft Copolymer

The particles can comprise a graft copolymer. Broadly, the graft copolymer may comprise and/or be obtainable by grafting (a) a polyalklyene oxide with (b) N-vinylpyrrolidone and (c) a vinyl ester. The graft copolymer is described in more detail below.

The particles may include from about 1% to about 75%, or to about 50%, or to about 40%, or to about 25%, or from about 1% to about 15%, or from about 1% to about 10%, or from about 1% to about 5%, or optionally from about 1% to about 30%, by weight of the particles, of the graft copolymer. Upon dissolution of the particles, the graft copolymer may be present in an aqueous treatment liquor, such as a wash liquor or a rinse liquor of an automatic washing machine, in an amount of about 5 ppm, or from about 10 ppm, or from about 25 ppm, or from about 50 ppm, to about 1500 ppm, or to about 1000 ppm, or to about 500 ppm, or to about 250 ppm.

The graft copolymer may comprise and/or be obtainable by grafting (a) a polyalkylene oxide which has a number average molecular weight of from about 1000 to about 20000 Da, or to about 15000, or to about 12000 Da, or to about 10000 Da and is based on ethylene oxide, propylene oxide, or butylene oxide, optionally based on ethylene oxide, with (b) N-vinylpyrrolidone, and further with (c) a vinyl ester derived from a saturated monocarboxylic acid containing from 1 to 6 carbon atoms, optionally a vinyl ester that is vinyl acetate or a derivative thereof; where the weight ratio of (a):(b) is from about 1:0.1 to about 1:1; where the amount, by weight, of (a) is greater than the amount of (c); and where the order of the addition of monomers (b) and (c) in the graft polymerization is immaterial.

The graft copolymer may comprise and/or be obtainable by grafting (a) an alkylene oxide which has a number average molecular weight of from about 1000 to 20000 Da, or to about 15000, or to about 12000 Da, or to about 10000 Da, the alkylene oxide being based on ethylene oxide, with (b) N-vinylpyrrolidone, and (c) vinyl acetate or a derivative thereof; wherein the weight ratio of (a):(b) is from about 1:0.1 to about 1:2, or to about 1:1; wherein the weight ratio of (b):(c) is from about 1:0.1 to about 1:5, or to about 1:4; wherein the weight ratio of (a):(c) is from about 1:0.1 to about 1:5, or to about 1:3; the order of the addition of monomers (b) and (c) in the graft polymerization being immaterial.

The graft copolymer may be obtainable by grafting (a) an alkylene oxide which has a number average molecular weight of from about 1000 to 20000 Da, or to about 15000, or to about 12000 Da, or to about 10000 Da, the alkylene oxide being based on ethylene oxide, with (b) N-vinylpyrrolidone, and (c) vinyl acetate or a derivative thereof, the order of the addition of monomers (b) and (c) in the graft polymerization being immaterial, wherein the number of grafting sites is less than 1 per 50 ethylene oxide groups.

The graft bases used may be the polyalkylene oxides specified above under (a). The polyalkylene oxides of component (a) may have a number average molecular weight of about 300, or from about 1000 Da, or from about 2000 Da, or from about 3000, to about 20000 Da, or to about 15000, or to about 12000 Da, or to about 10000 Da, or to about 8000 Da, or to about 6000 Da. Without wishing to be bound by theory, it is believed that if the molecular weight of component (a) (e.g., polyethylene glycol), is relatively low, there may be a performance decrease in dye transfer inhibition. Additionally or alternatively, when the molecular weight is too high, the polymer may not remain suspended in solution and/or may deposit on treated fabrics.

The polyalkylene oxides may be based on ethylene oxide, propylene oxide, butylene oxides, or mixtures thereof, optionally ethylene oxide. The polyalkylene oxides may be based on homopolymers of ethylene oxide or ethylene oxide copolymers having an ethylene oxide content of from about 40 to about 99 mole %. Suitable comonomers for such copolymers may include propylene oxide, n-butylene oxide, and/or isobutylene oxide. Suitable copolymers may include copolymers of ethylene oxide and propylene oxide, copolymers of ethylene oxide and butylene oxide, and/or copolymers of ethylene oxide, propylene oxide, and at least one butylene oxide. The copolymers may include an ethylene oxide content of from about 40 to about 99 mole %, a propylene oxide content of from about 1 to about 60 mole %, and a butylene oxide content of from about 1 to about 30 mole %. The graft base may be linear (straight-chain) or branched, for example a branched homopolymer and/or a branched copolymer.

Branched copolymers may be prepared by addition of ethylene oxide with or without propylene oxides and/or butylene oxides onto polyhydric low molecular weight alcohols, for example trimethylol propane, pentoses, or hexoses. The alkylene oxide unit may be randomly distributed in the polymer or be present therein as blocks.

The polyalkylene oxides of component (a) may be the corresponding polyalkylene glycols in free form, that is, with OH end groups, or they may be capped at one or both end groups. Suitable end groups may be, for example, C1-C25-alkyl, phenyl, and C1-C14-alkylphenyl groups. The end group may be a C1-alkyl (e.g., methyl) group. Suitable materials for the graft base may include PEG 300, PEG 1000, PEG 2000, PEG 4000, PEG 6000, PEG 8000, PEG 10000, PEG 12000, and/or PEG 20000, which are polyethylene glycols, and/or MPEG 2000, MPEG 4000, MPEG 6000, MPEG 8000 and MEG 10000 which are monomethoxypolyethylene glycols that are commercially available from BASF under the tradename PLURIOL.

The polyalkylene oxides may be grafted with N-vinylpyrrolidone as the monomer of component (b). Without wishing to be bound by theory, it is believed that the presence of the N-vinylpyrrolidone ("VP") monomer in the graft copolymers according to the present disclosure provides water-solubility and good film-forming properties compared to otherwise-similar polymers that do not contain the VP monomer. The vinyl pyrrolidone repeat unit has amphiphilic character with a polar amide group that can form a dipole, and a non-polar portion with the methylene groups in the backbone and the ring, making it hydrophobic. When the vinyl pyrrolidone content is too high, there may be negative effects on softness and material cost is high with high vinyl pyrrolidone content.

The polyalkylene oxides may be grafted with a vinyl ester as the monomer of component (c). The vinyl ester may be derived from a saturated monocarboxylic acid, which may contain 1 to 6 carbon atoms, or from 1 to 3 carbon atoms, or from 1 to 2 carbon atoms, or 1 carbon atom. Suitable vinyl esters may be selected from the group consisting of vinyl formate, vinyl acetate, vinyl propionate, vinyl butyrate, vinyl valerate, vinyl iso-valerate, vinyl caproate, or mixtures thereof. Preferred monomers of component (c) include those selected from the group consisting of vinyl acetate, vinyl propionate, or mixtures thereof, optionally vinyl acetate. The monomers of the graft copolymer, e.g., components (a), (b), and/or (c), may be present in certain ratios, such as weight ratios and/or mole ratios.

For example, the weight ratio of (a):(b) may be from about 1:0.1 to about 1:1, or from about 1:0.2 to about 1:0.7. The weight ratio of (a):(b) may be from about 1:0.1 to about 1:2, or to about 1:1. When the VP ratio is too high, the polymer may form negative interactions with other composition ingredients and/or may not work sufficiently on some hydrolyzed reactive dyes.

The weight ratio of (a):(c) may be greater than 1:1, or from about 1:0.1 to about 1:0.8, or from about 1:0.2 to about 1:0.6. The weight ratio of (a):(c) is from about 1:0.1 to about 1:5, or to about 1:3. The amount, by weight, of (a) may be greater than the amount of (c). Without wishing to be bound by theory, it is believed that relatively high levels of component (c) (e.g., vinyl acetate), particularly in relation to component (a), may result in decreased performance of dye transfer inhibition and/or relatively greater hydrophobicity, which can lead to formulation and/or stability challenges.

The weight ratio of (b):(c) may be from about 1:0.1 to about 1:5, or to about 1:4. Without wishing to be bound by theory, a ratio of VP-to-VAc that is too high may lead to higher deposition on fabric causing the treated fabric to have a negative feel. Additionally, negative interactions with ingredients such as brighteners may occur.

The graft copolymers of the present disclosure may be characterized by relatively low degree of branching (i.e., degree of grafting). In the graft copolymers of the present disclosure, the average number of grafting sites may be less than or equal to 1, or less than or equal to 0.8, or less than or equal to 0.6, or less than or equal to 0.5, or less than or equal to 0.4, per 50 alkylene oxide groups, e.g., ethylene oxide groups. The graft copolymers may comprise, on average, based on the reaction mixture obtained, at least 0.05, or at least 0.1, graft site per 50 alkylene oxide groups, e.g., ethylene oxide groups. The degree of branching may be determined, for example, by means of $^{13}C$ NMR spectroscopy from the integrals of the signals of the graft sites and the $—CH_2$-groups of the polyalkylene oxide. The number of grafting sites may be adjusted by manipulating the temperature and/or the feed rate of the monomers. For example, the polymerization may be carried out in such a way that an excess of component (a) and the formed graft copolymer is constantly present in the reactor. For example, the quantitative molar ratio of component (a) and polymer to ungrafted monomer (and initiator, if any) is generally greater than or equal to about 10:1, or to about 15:1, or to about 20:1.

The graft copolymers of the present disclosure may be characterized by a relatively narrow molar mass distribution. For example, the graft copolymers may be characterized by a polydispersity $M_w/M_n$ of less than or equal to about 3, or less than or equal to about 2.5, or less than or equal to about 2.3. The polydispersity of the graft copolymers may be from about 1.5 to about 2.2. The polydispersity may be determined by gel permeation chromatography using narrow-distribution polymethyl methacrylates as the standard.

The graft copolymers may be prepared by grafting the suitable polyalkylene oxides of component (a) with the monomers of component (b) in the presence of free radical initiators and/or by the action of high-energy radiation, which may include the action of high-energy electrons. This may be done, for example, by dissolving the polyalkylene oxide in at least one monomer of group (b), adding a polymerization initiator and polymerizing the mixture to completion. The graft polymerization may also be carried out semicontinuously by first introducing a portion, for example 10%, of the mixture of polyalkylene oxide to be polymerized, at least one monomer of group (b) and/or (c) and initiator, heating to polymerization temperature and, after the polymerization has started, adding the remainder of the mixture to be polymerized at a rate commensurate with the rate of polymerization. The graft copolymers may also be obtained by introducing the polyalkylene oxides of group (a) into a reactor, heating to the polymerization temperature, and adding at least one monomer of group (b) and/or (c) and polymerization initiator, either all at once, a little at a time, or uninterruptedly, optionally uninterruptedly, and polymerizing.

In the preparation of the graft copolymers, the order in which the monomers (b) and (c) are grafted onto component (a) may be immaterial and/or freely chooseable. For example, first N-vinylpyrrolidone may be grafted onto component (a), and then a monomer (c) or a mixture of monomers of group (c). It is also possible to first graft the monomers of group (c) and then N-vinylpyrrolidone onto the graft base (a). It may be that a monomer mixture of (b)

and (c) are grafted onto graft base (a) in one step. The graft copolymer may be prepared by providing graft base (a) and then first grafting N-vinylpyrrolidone and then vinyl acetate onto the graft base.

Any suitable polymerization initiator(s) may be used, which may include organic peroxides such as diacetyl peroxide, dibenzoyl peroxide, succinyl peroxide, di-tert-butyl peroxide, tert-butyl perbenzoate, tert-butyl perpivalate, tert-butyl permaleate, cumene hydroperoxide, diisopropyl peroxodicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl peracetate, di-tert-amyl peroxide, tert-butyl hydroperoxide, mixtures thereof, redox initiators, and/or azo starters. The choice of initiator may be related to the choice of polymerization temperature.

The graft polymerization may take place at from about 50° C. to about 200° C., or from about 70° C. to about 140° C. The graft polymerization may typically be carried out under atmospheric pressure, but may also be carried out under reduced or superatmospheric pressure.

The graft polymerization may be carried out in a solvent. Suitable solvents may include: monohydric alcohols, such as ethanol, propanols, and/or butanols; polyhydric alcohols, such as ethylene glycol and/or propylene glycol; alkylene glycol ethers, such as ethylene glycol monomethyl and -ethyl ether and/or propylene glycol monomethyl and -ethyl ether; polyalkylene glycols, such as di- or tri-ethylene glycol and/or di- or tri-propylene glycol; polyalkylene glycol monoethers, such as poly(C2-C3-alkylene)glycol mono (C1-C16-alkyl)ethers having 3-20 alkylene glycol units; carboxylic esters, such as ethyl acetate and ethyl propionate; aliphatic ketones, such as acetone and/or cyclohexanone; cyclic ethers, such as tetrahydrofuran and/or dioxane; or mixtures thereof.

The graft polymerization may also be carried out in water as solvent. In such cases, the first step may be to introduce a solution which, depending on the amount of added monomers of component (b), is more or less soluble in water. To transfer water-insoluble products that can form during the polymerization into solution, it is possible, for example, to add organic solvents, for example monohydric alcohols having 1 to 3 carbon atoms, acetone, and/or dimethylformamide. In a graft polymerization process in water, it is also possible to transfer the water-insoluble graft copolymers into a finely divided dispersion by adding customary emulsifiers or protective colloids, for example polyvinyl alcohol. The emulsifiers used may be ionic or nonionic surfactants whose HLB value is from about 3 to about 13. HLB value is determined according to the method described in the paper by W. C. Griffin in J. Soc. Cosmet. Chem. 5 (1954), 249.

The amount of surfactant used in the graft polymerization process may be from about 0.1 to about 5% by weight of the graft copolymer. If water is used as the solvent, solutions or dispersions of graft copolymers may be obtained. If solutions of graft copolymers are prepared in an organic solvent or in mixtures of an organic solvent and water, the amount of organic solvent or solvent mixture used per 100 parts by weight of the graft copolymer may be from about 5 to about 200, optionally from about 10 to about 100, parts by weight.

The graft copolymers may have a K value of from about 5 to about 200, optionally from about 5 to about 50, determined according to H. Fikentscher in 2% strength by weight solution in dimethylformamide at 25 C.

After the graft polymerization, the graft copolymer may optionally be subjected to a partial hydrolysis. The graft copolymer may include up to 60 mole %, or up to 50 mole %, or up to 40 mole %, or up to 25 mole %, or up to 20 mole %, or up to 15 mole %, or up to 10 mole %, of the grafted-on monomers of component (c) are hydrolyzed. For instance, the hydrolysis of graft copolymers prepared using vinyl acetate or vinyl propionate as component (c) gives graft copolymers containing vinyl alcohol units. The hydrolysis may be carried out, for example, by adding a base, such as sodium hydroxide solution or potassium hydroxide solution, or alternatively by adding acids and if necessary heating the mixture. Without wishing to be bound by theory, it is believed that increasing the level of hydrolysis of component (c) increases the relative hydrophilicity of the graft copolymer, which in turn is believed to result in better suspension of the captured dyes.

Particles

The particles, and adjunct particles if present, can have individual mass from about 1 mg to about 1 g. The smaller the particles, and adjunct particles if present, the faster they tend to dissolve in water. Optionally the particles, and adjunct particles if present, can have an individual mass from about 10 mg to about 1 g, or even from about 20 mg to about 1 g, or even about 30 g to about 1 g. Optionally the particles, and adjunct particles if present, can have an individual mass from about 10 mg to about 500 mg, optionally about 20 mg to about 300 mg, optionally about 30 mg to about 150 mg.

An individual particle adjunct particle may have a volume from about 0.003 $cm^3$ to about 5 $cm^3$, optionally from about 0.003 $cm^3$ to about 1 $cm^3$, optionally from about 0.003 $cm^3$ to about 0.5 $cm^3$, optionally from about 0.003 $cm^3$ to about 0.2 $cm^3$, optionally from about 0.003 $cm^3$ to about 0.15 $cm^3$. Smaller particles, and adjunct particles if present, are thought to provide for better packing of the particles, and adjunct particles if present, in a container and faster dissolution in the wash.

The composition can comprise particles, and adjunct particles if present, that pass a sieve having a nominal sieve opening size of 22.6 mm and are retained on a sieve having a nominal sieve opening size of 0.841 mm. Particles and adjunct particles having a size such that they are retained on a sieve having a nominal opening size of 22.6 mm may tend to have a cold water dissolution time that is too great for a common wash cycle. Particles and adjunct particles having a size such that they pass a sieve having a nominal sieve opening size of 0.841 mm may be too small to conveniently handle. Particles and adjunct particles having a size within the aforesaid bounds may represent an appropriate balance between the cold water dissolution time and ease of particle handling.

A plurality of particles, and adjunct particles if present, may collectively comprise a dose for dosing to a laundry washing machine or laundry wash basin. A single dose of the particles, and adjunct particles if present, may comprise from about 1 g to about 50 g, alternatively any whole numbers of grams or ranges of whole numbers of grams within any of the aforementioned ranges.

The particles can comprise the water soluble carrier and graft copolymer. The composition can further comprise adjunct ingredients selected from the group consisting of quaternary ammonium compound, cationic polymer, acid, perfume, dye, enzyme, and mixtures thereof. One or more or all of the adjunct ingredients can be provided in the particles that comprise the water soluble carrier and graft copolymer. For example, the particles may comprise water soluble carrier, graft copolymer, and one or more adjuncts selected from the group consisting of quaternary ammonium compound, cationic polymer, acid, perfume, dye, enzyme, and mixtures thereof.

Optionally the one or more adjuncts can be provided in the composition in adjunct particles provided distinct from particles that comprise the water soluble carrier and graft copolymer. The adjunct particles can comprise an adjunct water soluble carrier. The adjunct water soluble carrier can be any of the water soluble carriers disclosed herein as a water soluble carrier for the graft copolymer. The adjunct water soluble carrier can be provided at any of the weight percentages described herein for the water soluble carrier of the graft copolymer. The adjunct water soluble carrier can be the same water soluble carrier that is in the particles comprising the graft copolymer.

The particles, or adjunct particles, can comprise an antioxidant. The antioxidant can help to promote stability of the color and or odor of the particles, and adjunct particles if present, over time between production and use. The particles, and adjunct particles if present, can comprise from about 0.01% to about 1% by weight antioxidant. The antioxidant can be butylated hydroxytoluene.

The particles, and adjunct particles if present, disclosed herein can be homogeneously structured particles or substantially homogeneously structured particles. A substantially homogenously structured particle is a particle in which the component materials forming the particle are substantially homogeneously mixed with one another. A substantially homogeneously structured particle need not be perfectly homogeneous. There may be variations in the degree of homogeneity that is within limits of mixing processes used by those skilled in the art in commercial applications to manufacture substantially homogeneously structured particles or homogeneously structured particles. The particles can have a continuous phase of water soluble carrier. Each of the particles can be a continuous phase of a mixture of the component materials forming the particle. So, for instance, if the particles comprise component materials A, B, and C, the particles can be a continuous phase of a mixture A, B, and C. The same can be said for any number of component materials forming the particles, by way of nonlimiting example, three, four, five, or more component materials.

A homogeneously structured particle is not a particle that has a core and coating, the particle being discrete from other particles having the same structure. A substantially homogeneously or homogeneously structured particle can be non-mechanically separable. That is, the component materials forming the homogeneously structured particle may not be mechanically separated, for instance by a knife or fine pick.

Homogeneously structured particles can be substantially free or free from inclusions having a size greater than about 500 m. Homogeneously structured particles can be substantially free from or free from inclusions having a size greater than about 200 m. Homogeneously structured particles can be substantially free from or free from inclusions having a size greater than about 100 m. Without being bound by theory, an abundance of large inclusions may be undesirable because they might interfere with the dissolution of the particle in the wash or leave visually perceptible residue on the articles being washed.

In a substantially homogeneous particle, the constituent materials can be substantially randomly or randomly dispersed or the constituent materials can be substantially randomly or randomly dispersed in the water soluble carrier. Without being bound by theory, substantially homogeneous structured particles are thought to possibly be less capital intense to produce and the processes to produce such particles are thought to result in more uniform particles which are more acceptable to the consumer.

The particles disclosed herein, and adjunct particles if present, in any of the embodiments or combinations disclosed, can have a shape selected from the group consisting of a sphere, hemisphere, oblate sphere, cylindrical, polyhedral, and oblate hemisphere. The particles disclosed herein, and adjunct particles if present, can have a ratio of maximum dimension to minimum dimension from about 10 to 1, optionally from about 8 to 1, optionally about 5 to 1, optionally about 3 to 1, optionally about 2 to 1. The particles, and adjunct particles if present, can be shaped such that the particles are not flakes. Particles having a ratio of maximum dimension to minimum dimension greater than about 10 are flakes and tend to be fragile such the particles are prone to becoming dusty. The fragility of the particles tends to decrease with decreasing values of the ratio of maximum dimension to minimum dimension.

Exemplary Compositions of Particles and Graft Copolymers

Exemplary formulations for particles described herein are set forth in Table 1.

TABLE 1

Example Particle Formulations (components for which multiple suitable materials are listed, all permutations of possible formulations are contemplated herein).

| | % by Weight | | | | | | | | | | | | | |
|---|---|---|---|---|---|---|---|---|---|---|---|---|---|---|
| Example | I | II | III | IV | V | VI | VII | VIII | IX | X | XI | XII | XIII | XIV |
| Water Soluble Carrier | 98[a] | 96[a] | 95[b] | 94[a] | 65[a] | 49[a] | 87[c] | 80[d] | 90[e] | 80[f] | 60[b] | 66[b] | 61[b] | 40[a]; 20[d] |
| Graft Copolymer According to Present Disclosure | 1 | 3 | 5 | 6 | 23 | 49 | 10 | 7 | 7 | 7 | 5 | — | 5 | 5 |
| Quaternary Ammonium Compound[g] | — | — | — | — | — | — | — | — | — | — | — | — | 19.5 | 19.5 |

TABLE 1-continued

Example Particle Formulations (components for which multiple suitable materials are listed, all permutations of possible formulations are contemplated herein).

| | % by Weight | | | | | | | | | | | | | |
|---|---|---|---|---|---|---|---|---|---|---|---|---|---|---|
| Example | I | II | III | IV | V | VI | VII | VIII | IX | X | XI | XII | XIII | XIV |
| Cationic Polymer Deposition Aid[h] | — | — | — | — | — | — | — | — | — | — | 3 | 3 | 3 | 3 |
| Fatty Acid[i] | — | — | — | — | — | — | — | — | — | — | 10 | — | 10.5 | 10.5 |
| Other Optional Ingredients | Water, solvents, perfume, encapsulated perfume[j], anti-oxidants, dyes, other optional ingredients to 100% | | | | | | | | | | | | | |

[a]Poly(ethylene glycol) 8000 available from Sigma-Aldrich, product number 89510, molecular weight 7000-9000 Da.
[b]Water soluble carrier 2 is a 65/35 blend by weight of PLURIOL E8000 and PLURIOL E4000 available from BASF, Ludwigshafen, Germany.
[c]Polyethylene glycol-co-polypropylene glycol, PLURONIC F68, PLURONIC E6800 from BASF, Ludwigshafen, Germany.
[d]Maltodextran MALTRIN M180 available from the Grain Processing Group, Muscatine, IA.
[e]Sodium acetate.
[f]Fructose.
[g]One or more of: C16-C18 Unsaturated DEEHMAMS (Diethyl Ester Hydroxyethyl Methyl Ammonium Methyl Sulphate) from Evonik; DEEDMAC (Di-tallowoylethanolester dimethylammonium chloride), where the fatty acid moieties have an Iodine Value of ~18-22 (e.g. about 20) (approximately 9% by weight ethanol and 3% by weight coconut oil); DEEDMAC (Di-tallowoylethanolester dimethylammonium chloride), where the fatty acid moieties have an Iodine Value of ~18-22 (e.g. 20) (approximately 9% by weight ethanol and 3% by weight coconut oil).
[h]one or more of: synthetic cationic polymer MERQUAT 280, available from Lubrizol, Wickliffe, Ohio, USA,; SALCARE 7 available from BASF, Ludwigshafen, Germany; cationic hydroxyethyl cellulose having a weight average molecular weight of 400 kDa, a charge density of 0.18, and an average weight percent of nitrogen per anhydroglucose repeat unit of 0.28%; Cationic hydroxyethyl cellulose having a weight average molecular weight of 400 kDa, a charge density of 0.18, and an average weight percent of nitrogen per anhydroglucose repeat unit of 0.28% (SUPRACARE 150 available from Dow Chemical).
[i]fatty acid blend of stearic acid and palmitic acid having an Iodine Value of 0.
[j]perfume accord encapsulates made from aminoplast resins or cross-linked poly(acrylates) optionally with a poly(vinylformamide) coating available from Encapsys, Appleton, WI.

a) Poly(ethylene glycol) 8000 available from Sigma-Aldrich, product number 89510, molecular weight 7000-9000 Da.
b) Water soluble carrier 2 is a 65/35 blend by weight of PLURIOL E8000 and PLURIOL E4000 available from BASF, Ludwigshafen, Germany.
c) Polyethylene glycol-co-polypropylene glycol, PLURONIC F68, PLURONIC E6800 from BASF, Ludwigshafen, Germany.
d) Maltodextran MALTRIN M180 available from the Grain Processing Group, Muscatine, IA.
e) Sodium acetate.
f) Fructose.
g) One or more of: C16-C18 Unsaturated DEEHMAMS (Diethyl Ester Hydroxyethyl Methyl Ammonium Methyl Sulphate) from Evonik; DEEDMAC (Di-tallowoylethanolester dimethylammonium chloride), where the fatty acid moieties have an Iodine Value of ~18-22 (e.g. about 20) (approximately 9% by weight ethanol and 3% by weight coconut oil); DEEDMAC (Di-tallowoylethanolester dimethylammonium chloride), where the fatty acid moieties have an Iodine Value of ~ 18-22 (e.g. 20) (approximately 9% by weight ethanol and 3% by weight coconut oil).
h) one or more of: synthetic cationic polymer MERQUAT 280, available from Lubrizol, Wickliffe, Ohio, USA; SALCARE 7 available from BASF, Ludwigshafen, Germany; cationic hydroxyethyl cellulose having a weight average molecular weight of 400 kDa, a charge density of 0.18, and an average weight percent of nitrogen per anhydroglucose repeat unit of 0.28%; Cationic hydroxyethyl cellulose having a weight average molecular weight of 400 kDa, a charge density of 0.18, and an average weight percent of nitrogen per anhydroglucose repeat unit of 0.28% (SUPRACARE 150 available from Dow Chemical).
i) fatty acid blend of stearic acid and palmitic acid having an Iodine Value of 0.
j) perfume accord encapsulates made from aminoplast resins or cross-linked poly(acrylates) optionally with a poly(vinylformamide) coating available from Encapsys, Appleton, WI.

Examples of graft copolymers include those listed in Table 2.

TABLE 2

Examples of graft copolymers as described herein.

| Graft Copolymer | Monomer Ratio (by weight) | | | PEG Molecular Weight | K- | VAc |
|---|---|---|---|---|---|---|
| Examples | PEG | VP | VAc | (Da) | Value | Hydrolysis |
| 1A | 1.00 | 0.28 | 0.13 | 4000 | 22.9 | <20% |
| 1B | 1.00 | 0.31 | 0.25 | 4000 | 21.6 | <20% |
| 1C | 1.00 | 0.35 | 0.40 | 4000 | 19.7 | <20% |
| 1D | 1.00 | 0.40 | 0.60 | 4000 | 20.1 | <20% |
| 1E | 1.00 | 0.40 | 0.60 | 2000 | 18.3 | <20% |
| 1F | 1.00 | 0.40 | 0.60 | 6000 | 23.5 | <20% |
| 1G | 1.00 | 0.40 | 0.60 | 8000 | 26.3 | <20% |
| 1H | 1.00 | 0.40 | 0.60 | 4000 | 20.6 | 20% |
| 1I | 1.00 | 0.40 | 0.60 | 4000 | 21.0 | 40% |
| 1J | 1.00 | 0.40 | 0.60 | 6000 | 24.4 | 20% |
| 1K | 1.00 | 0.40 | 0.60 | 6000 | 24.5 | 40% |
| 1L | 1.00 | 0.40 | 0.60 | 6000 | 24.4 | 60% |
| 1M | 1.00 | 0.50 | 1.00 | 4000 | 19.2 | <20% |

PEG = poly(ethylene glycol);
VP = vinyl pyrrolidone;
VAc = vinyl acetate
* Not determined K-value, in Table 2, is a measure of the relative viscosity of dilute polymer solutions and is a relative measure of the average molecular weight. As the average molecular weight of the polymer increases for a particular polymer, the K-value tends to also increase. The K-value is determined in a 3% by weight NaCl solution at 23° C. and a polymer concentration of 1% polymer according to the method of H. Fikentscher in *Cellulosechemie,* 1932, 13, 58.

Synthesis of Graft Copolymer 1K

A polymerization vessel equipped with stirrer and reflux condenser is initially charged with 720 g of PEG (6000 g/mol) and 60 g ethyl acetate under nitrogen atmosphere. The mixture is homogenized at 70° C. Then, 432 g of vinyl acetate (in 2 h), 288 g of vinylpyrrolidone in 576 g of ethyl acetate (in 5 h), and 30.2 g of tert.-butyl perpivalate in 196.6 g ethyl acetate (in 5.5 h) are metered in. Upon complete addition of the feeds, the solution is stirred at 70° C. for 1 h. Subsequently, 3.8 g tert.-butyl perpivalate in 25.0 g ethyl acetate (in 1.5 h) were metered in followed by 0.5 h of stirring. The volatiles are removed by vacuum stripping. Then, 676.8 g deionized water are added and a steam distillation is conducted at 100° C. for 1 h. The resulting graft polymer is characterized by a K-value of 20.8. The solid content of the final solution is 48.8%.

Polymer is hydrolyzed to sample 1K.

Process for Treating Laundry

The particles disclosed herein enable consumers to inhibit dye transfer of hydrolyzed reactive dyes during washing and optionally provide additional fabric care benefits, particularly through the wash, in particular the wash sub-cycle. By providing the reduction in dye transfer benefit through the wash sub-cycle, consumers only need to dose the detergent composition and the particles to a single location, for example the wash basin, prior to or shortly after the start of the washing machine.

The process for treating laundry can comprise the steps of providing laundry in a washing machine. The composition can be dispensed into the washing machine. The laundry can be contacted with water. The composition can be dissolved in the water to form a laundry treatment liquor. The laundry can be contacted with the laundry treatment liquor. The laundry can be contacted with water during the wash sub-cycle of the washing machine.

The particles can comprise the constituent components at the weight fractions described herein. For example, the particles can comprise about 25% to about 99% by weight a water soluble carrier. The particles can further comprise about 1% to about 75% by weight a graft copolymer. The particles can each have an individual mass from about 1 mg to about 1 g.

The composition can be dispensed into the washing machine in a dose of from 3 g to about 200 g of the composition. The composition can be dispensed from a container into a dosing device. The dosing device can be a closure of the container or otherwise engageable or disengageable with the container.

The process can optionally comprise a step of contacting the laundry during the wash sub-cycle with a detergent composition comprising an anionic surfactant. During the wash sub-cycle, the wash basin may be filled or at least partially filled with water. The particles can dissolve into the water to form a wash liquor comprising the components of the particles. Optionally, if a detergent composition is employed, the wash liquor can include the components of the detergent composition and the particles or dissolved particles. The particles can be placed in the wash basin of the washing machine before the laundry is placed in the wash basin of the washing machine. The particles can be placed in the wash basin of the washing machine after the laundry is placed in the wash basin of the washing machine. The particles can be placed in the wash basin prior to filling or partially filling the wash basin with water or after filling of the wash basin with water has commenced.

If a detergent composition is employed by the consumer in practicing the process of treating laundry, the detergent composition and particles can be provided from separate packages. For instance, the detergent composition can be a liquid detergent composition provided from a bottle, sachet, water soluble pouch, dosing cup, dosing ball, or cartridge associated with the washing machine. The particles can be provided from a separate package, by way of non-limiting example, a carton, bottle, water soluble pouch, dosing cup, sachet, or the like. If the detergent composition is a solid form, such as a powder, water soluble fibrous substrate, water soluble sheet, water soluble film, water soluble film, water insoluble fibrous web carrying solid detergent composition, the particles can be provided with the solid form detergent composition. For instance, the particles can be provided from a container containing a mixture of the solid detergent composition and the particles. Optionally, the particles can be provided from a pouch formed of a detergent composition that is a water soluble fibrous substrate, water soluble sheet, water soluble film, water soluble film, water insoluble fibrous web carrying solid detergent composition.

Production of Particles

For a water soluble carrier that can be processed conveniently as a melt, the rotoforming process can be used to produce the particles. A mixture of molten water soluble carrier and the other materials constituting the particles is prepared, for instance in a batch or continuous mixing process. The molten mixture can be pumped to a rotoformer, for instance a Sandvik ROTOFORM 3000 having a 750 mm wide 10 m long belt. The rotoforming apparatus can have a rotating cylinder. The cylinder can have 2 mm diameter apertures set at a 10 mm pitch in the cross machine direction and 9.35 mm pitch in the machine direction. The cylinder can be set at approximately 3 mm above the belt. The belt speed and rotational speed of the cylinder can be set at about 10 m/min. The molten mixture can be passed through the apertures in the rotating cylinder and deposited on a moving conveyor that is provided beneath the rotating cylinder.

The molten mixture can be cooled on the moving conveyor to form a plurality of solid particles. The cooling can be provided by ambient cooling. Optionally the cooling can be provided by spraying the under-side of the conveyor with ambient temperature water or chilled water.

Once the particles are sufficiently coherent, the particles can be transferred from the conveyor to processing equipment downstream of the conveyor for further processing and or packaging.

Optionally, the particles can be provided with inclusions of a gas. Such occlusions of gas, for example air, can help the particles dissolve more quickly in the wash. Occlusions of gas can be provided, by way of nonlimiting example, by injecting gas into the molten precursor material and milling the mixture.

Particles can also be made using other approaches. For instance, granulation or press agglomeration can be appropriate. In granulation, the precursor material containing the constituent materials of the particles is compacted and homogenized by rotating mixing tools and granulated to form particles. For precursor materials that are substantially free of water, a wide variety of sizes of particles can be made.

In press agglomeration, the precursor material containing the constituent materials of the particles is compacted and plasticized under pressure and under the effect of shear forces, homogenized and then discharged from the press agglomeration machine via a forming/shaping process. Press agglomeration techniques include extrusion, roller compacting, pelleting, and tableting.

The precursor material containing the constituent materials of the particles can be delivered to a planetary roll extruder or twin screw extruder having co-rotating or contra-rotating screws. The barrel and the extrusion granulation head can be heated to the desired extrusion temperature. The precursor material containing the constituent materials of the particles can be compacted under pressure, plasticized, extruded in the form of strands through a multiple-bore extrusion die in the extruder head, and sized using a cutting blade. The bore diameter of the of extrusion header can be selected to provide for appropriately sized particles. The extruded particles can be shaped using a spheronizer to provide for particles that have a spherical shape.

Optionally, the extrusion and compression steps may be carried out in a low-pressure extruder, such as a flat die pelleting press, for example as available from Amandus Kahl, Reinbek, Germany. Optionally, the extrusion and compression steps may be carried out in a low pressure extruder, such as a BEXTRUDER, available from Hosokawa Alpine Aktiengesellschaft, Augsburg, Germany.

The particles can be made using roller compacting. In roller compacting the precursor material containing the constituent materials of the particles is introduced between two rollers and rolled under pressure between the two rollers to form a sheet of compactate. The rollers provide a high linear pressure on the precursor material. The rollers can be heated or cooled as desired, depending on the processing characteristics of the precursor material. The sheet of compactate is broken up into small pieces by cutting. The small pieces can be further shaped, for example by using a spheronizer.

Performance of Particles

The test method used to evaluate the performance of various particles are described as follows.

Dye Transfer Fabric Treatment Method in a Mini-Washing Machine. New fabrics are pre-washed for two cycles in a NA Top Loading washing machine such as Kenmore 600 series at 60° C. using 0 gpg water with detergent (48 g of AATCC 2003 Standard Reference Liquid Detergent without optical brightener from Test Fabrics Inc., W. Pittston, Pa.), washed for three water-only cycles and dried. The pre-washed fabrics are treated with detergent and any other materials as outlined in the experiments below in the presence of dye bleeder fabrics using a mini-washing machine. The mini-washing machine is designed to mimic full scale washing machine conditions. The mini-washer uses a stainless steel cylinder spray-coated with porcelain spraying kit typically used on bathtubs (25 cm diameter by 22 cm height) that is fitted with a staggered level, 5-vane paddle with controllable settings for fill, wash/rinse times, and spin-speeds.

The mini-washer is filled to a 5.7 L fill volume and is programmed for a 60 min wash cycle, and a 20 min rinse cycle with an agitation speed of 75 strokes per min using 15 gpg/50° C. (122° F.) water for the wash and 15 gpg/38° C. (100° F.) water for the rinse. Unless otherwise noted in the experiments below, the Detergent Composition (14.7 g) and the water soluble particle composition (7.4 g) and any other materials as outlined in the experiments below are added to the washing pot after the water is filled, agitated for 30 s, then dye bleeder fabrics (7 pieces of 7.6 cm×cm×11.4 cm swatches of Reactive Brown 7 on cotton, STC EMPA 136, ex Test Fabrics, West Pittston, Pa.) are added to the machine and agitated for 60 s, and then pre-washed dye acceptor fabrics and ballast are added. The acceptor fabrics (120 g) are two, 100% cotton, GILDAN, Toddler size 2T, white t-shirts, with test fabric swatches (9.5 cm×9.5 cm) sewn onto the shirt. White test fabrics (available from WfK Testgewebe GmbH, Brüggen, Germany) include 100% cotton knit (#19502), 98/2 cotton/spandex #19506, 80/20 nylon/spandex (#19505), polyamide (#19504), polyester (#19508), polyester/cotton (65/35, #19503) polyester/spandex (#19507) and MFF #49 that are sewn onto the GILDAN t-shirt. Ballast fabrics (2× white 100% cotton, white GILDAN t-shirts, Toddler size 2T and 1×50/50 cotton/polyester, white GILDAN t-shirts Youth, size XS) are added for a total fabric weight of 400±15 g. Once the detergent, and all test fabrics are added to the mini-washer, the timed cycle begins. After the washing cycle is complete, the dye bleeder fabrics are removed, and the acceptor test fabrics and ballast are dried in an automatic tumble dryer on low for 45 min (KENMORE dryer series), or until dry. The test fabrics are washed once or for a total of three washing cycles, and then test fabrics are de-linted using a lint roller to remove and fuzz that could interfere with the spectrophotometer measurement. Spectrophotometric measurement is taken using a Konica-Minolta Spectrophotomer CM-3610d.

Dye Transfer Fabric Treatment Method in a Tergotometer. The tergotometer is filled to a 1 L fill volume and is programmed for a 45 min wash cycle, and a 5 min rinse cycle with an agitation speed of 300 rpm using 15 gpg/50° C. (122° F.) water for the wash and 15 gpg/25° C. (77° F.) water for the rinse with Angle of Rotation 720°. The Detergent Composition (2.6 g) and the water soluble particle composition (1.3 g), and any other materials as outlined in the experiments below are added to the washing pot after the water is filled and then agitated for 60 s. Once dilution step is completed the dye bleeder fabrics (15 pieces of 5 cm×5 cm swatches of Reactive Brown 7 on cotton, STC EMPA 136 available from SWISSATEST Testmaterialien AG, St. Gallen, Switzerland) are added to the machine along with dye acceptor fabrics and ballast. Two each of the acceptor fabrics (10 g, 5 cm×5 cm) include 100% cotton knit (#19502), 98/2 cotton/spandex (#19506), 80/20 nylon/spandex (#19505), and polyamide (#19504) (available from WfK Testgewebe GmbH, Brüggen, Germany). Knitted cotton ballast (60 g) swatches (5 cm×5 cm) added for a total fabric weight of 70 g±2 g. Once the detergent, and all test fabrics are added to the Tergotometer pot, the timed cycle begins. After the washing cycle is complete, the dye bleeder fabrics are removed, and the acceptor test fabrics and ballast are air dried overnight in drying cupboard. Test fabrics are de-linted to remove lint and fuzz that could interfere with the spectrophotometer measurement. Spectrophotometric measurement is taken using GretagMacbeth Color-Eye 7000A manufactured by X-RITE, grand Rapids, Mich.

Detergent Composition Used in the Mini-Washing Machine and Tergotometer Methods. Table 3 shows the liquid detergent fabric care compositions prepared by mixing the ingredients listed in the proportions shown below and used in the experiments described herein.

TABLE 3

| Detergent Composition Used in the Dye Transfer Fabric Treatment Methods. | | |
|---|---|---|
| | Detergent Composition (wt %) | |
| Ingredient | A | B |
| $C_{12}$-$C_{15}$ alkyl polyethoxylate sulfate[1] | 6.0 | 6.0 |
| $C_{11.8}$ linear alkylbenzene sulfonic acid[2] | 13.7 | 13.7 |
| $C_{14}$-$C_{15}$ alkyl 7-ethoxylate[1] | 5.8 | 5.8 |
| $C_{12}$-$C_{14}$ amine oxide | 0.5 | 0.5 |
| $C_{12}$-$C_{18}$ Fatty Acid[4] | 1.0 | 1.0 |
| Na Cumene Sulfonate | 0.5 | 0.5 |
| Citric acid | 2.2 | 2.2 |
| Hydrogenated castor oil[5] | 0.2 | 0.2 |
| Graft copolymer described herein | — | 3.0 |
| Water, enzymes[6,7], perfumes, encapsulated perfume[8], dyes, buffers, neutralizers, chelants, solvents, stabilizers, and other optional components | to 100% pH 7.0-8.5 | to 100% pH 7.0-8.5 |

[1]Available from Shell Chemicals, Houston, TX.
[2]Available from Huntsman Chemicals, Salt Lake City, UT.
[3] Available from Sasol Chemicals, Johannesburg, South Africa
[4]Available from The Procter & Gamble Company, Cincinnati, OH.
[5]Available under the tradename THIXIN R from Elementis Specialties, Highstown, NJ
[6]Available from DuPont-Genencor, Palo Alto, CA.
[7]Available from Novozymes, Copenhagen, Denmark.
[8]Available from Encapsys, Appleton, WI.

Method of Denim Fading in a Mini-Washing Machine. The same mini-washing machine procedure as the Dye Transfer Fabric Treatment Method in a Mini-Washing Machine is used with the following changes: (1) instead of adding Reactive Brown 7 on cotton bleeder swatches (STC EMPA 136), Indigo denim (STC SWT 277 ex test Fabrics, West Pittston, Pa.) and a black retail denim from H&M (3 pieces each of 11.4 cm×11.4 cm swatches sewn onto 100% cotton knit) are used, and added at the beginning of the experiment. Ten washes are done, and no additional swatches are added with subsequent wash cycles. The black denim swatch and the white cotton knit acceptor test fabrics are measured on a Konica Minolta spectrophotomer according to the method below where the change in L is used to describe the fading of the black denim and the dE2000 is used to describe the dye transfer onto the white 100% cotton knit test fabric (#19502).

Dye Transfer Measurement Method on Treated Fabrics. As used herein, the "L*C*h color space" and "L*a*b* color space" are three dimensional colorimetric models developed by Hunter Associates Laboratory and recommended by the Commission Internationale d'Eclairage ("CIE") to measure the color or change in color of a dyed article. The CIE L*a*b* color space ("CIELAB") has a scale with three-fold axes with the L axis representing the lightness of the color space (L*=0 for black, L*=100 for white), the a* axis representing color space from red to green (a*>0 for red, a*<0 for green) and the b* axis representing color space from yellow to blue (b*>0 for yellow, b*<0 for blue). The L*C*h color space is an approximately uniform scale with a polar color space. The CIE L*C*h color space ("CIELCh") scale values are determined instrumentally and may also be calculated from the CIELAB scale values. Term definitions and equation derivations are available from Hunter Associates Laboratory, Inc. and from www.hunterlab.com, and are incorporated in their entirety by reference herein.

The amount of dye transfer onto the white test fabrics can be described, for example, in terms of the change in L*C*h before and after treatment of the test fabric as measured via spectrophotometry (for example, via a Spectrophotomer CM-3610d, manufactured by Konica Minolta, Tokyo, Japan) and is reported as $dE_{2000}$ value. As used herein, the $dE_{2000}$ value includes the vector associated with the distance in the L*C*h space between the initial L*C*h value and the final L*C*h value and corrected for perception according to the procedure detailed in G. Sharma, et al, in "The CIE dE2000 Colour Difference Formula: Implementation Notes, Supplementary test Data and Mathematical Observations, Color Research and Application, Vol 30 (1), 2005, p 21-30. Test fabrics from the mini-washing machine fabric treatment method are are measured against the backing of the GILDAN t-shirt. An average of two L*ab measures are taken per test fabric and two test fabrics are measured per test leg.

Cold-Water Dispersion Time Method. In-market detergent (1 mL, TIDE) is diluted into 500 mL of 15 gpg Millipore water at 15° C. (60° F.) to simulate the wash liquor of a North America high efficiency washing machine (assuming an 18 L water fill volume), then 0.25 g±0.005 g of particles was added. The solution was stirred using a stir bar on a magnetic stirrer at 400 rpm and the time is recorded when the particles have completely dissolved and dispersed as determined by visual assessment of a clear solution. The experiment is repeated 3 times, and the average of the 3 dispersion experiments as the cold-water dispersion time reported in minutes.

Small Scale Method of Making Particles. To prepare small scale batches of particles (approximately 100 g), a benchtop procedure was used. To a pre-weighed, plastic FLACK TEK speed mixer container is added PEG 8000, and the sealed jar is placed in an oven at 80° C. until the PEG 8000 melts. To this melt is added the desired amount of graft copolymer that has been pre-heated in a 50° C. oven. The composition is speed mixed at 3500 rpm for one minute in a speed mixer such as the FLACKTEK DAC150.FVZ-K speed mixer (Flacktek, Inc., Landrum, SC, USA). The mixed melt is immediately poured onto a silicone mold with 2 mm in diameter, hemispherical indentations and the material is evenly spread with a large metal mixing spatula. The composition mixture is cooled to room temperature for a minimum of 5 minutes to solidify. Once cooled, the particles are removed from the mold and equilibrated on a tray to a constant weight. The small scale method of making particles was used to prepare particle compositions used in Experiments 1-8 described herein.

Experiment 1 shows the effect of the water soluble carrier, the graft copolymer, and the benefit of the combination on Reactive Brown 7 dye transfer onto 100% cotton knit (CK) after one wash according to the Dye Transfer Fabric Treatment Method in a Tergotometer without using any detergent in the wash. Test Leg 1B shows that the water soluble carrier results in 1.1 units less dye transfer compared to water alone, the graft copolymer added as solution results in 3.4 units less dye transfer (Test Leg 1C), and the graft copolymer delivered in the particle form decreases dye transfer by 3.8 units (Test Leg 1D). Thus, dye transfer is reduced by providing the graft copolymer in particles as compared to providing the graft copolymer in a solution. Further, dye transfer is reduced by providing the graft copolymer in either particles or solution, as compared to only providing the water soluble carrier.

TABLE 4

Experiment 1. Less Dye Transfer with the Graft Copolymer, Particularly when Provided in a Particle.

| Test Leg | Deter-gent | Water Soluble Carrier | 75 ppm Graft Co-polymer | Dye Transfer Units After 1 Wash on CK | Improvement versus Reference (Less dye transfer) |
|---|---|---|---|---|---|
| 1A | none | none | none | 6.4 | Reference |
| 1B | none | PEG8000[a] | none | 5.3 | 1.1 unit less |
| 1C | none | none | Solution | 3.3 | 3.4 units less |
| 1D | none | PEG8000 | Water Soluble Particle[a] | 2.6 | 3.8 units less |

[a]The graft copolymer 1K is formulated into the water soluble particle at 5.7% by weight (Example IV).

Experiment 2 shows the effect of the combination of the water soluble carrier and the graft copolymer on Reactive Brown 7 dye transfer onto 100% cotton knit (CK) and nylon/spandex (NS) acceptor fabrics when washed three times including detergent in the Dye Transfer Fabric Treatment Method in a Mini-washing Machine. Compared to the Detergent Composition A, when the graft copolymer is formulated into the detergent in Detergent Composition B (Test Leg 2C), the amount of dye transfer decreases by 4.9 units on CK and 6.1 units on NS. Test Leg 2D shows that the combination of the graft copolymer and the water soluble carrier has even less dye transfer with 5.4 units less dye transfer on CK, and 6.6 units less dye transfer on NS compared to the dye transfer when only Detergent Composition A is used. Using the water soluble carrier to deliver the graft copolymer to the wash results in a 0.5 unit improvement as compared to adding the graft polymer to the detergent in Detergent Composition B (Test Leg 2D versus 2C). Thus, dye transfer is reduced by providing the graft copolymer in particles as compared to providing the graft copolymer in a detergent. Further, dye transfer is reduced by providing the graft copolymer in either particles or detergent, as compared to only providing the water soluble carrier.

Detergent Composition A, and fabrics are washed according to the Dye Transfer Fabric Treatment Method in a Mini-washing Machine for 1 wash. The amount of dye transfer is highest when no water soluble carrier and no polymer are added (Test Leg 3A). The results in Table 6 show that as the molecular weight of the water soluble carrier increases, the dye transfer onto 100% cotton knit (CK) decreases when no graft copolymer is used. When the graft copolymer is used, there is even less dye transfer (Test Legs 3B to 3E). Thus, dye transfer with the water soluble carrier decreases as the molecular weight of the water soluble carrier is increased, and further dye transfer is reduced by providing the particles in a water soluble particle.

TABLE 6

Experiment 3. Dye Transfer Decreases with Increasing Molecular Weight of the Water Soluble Carrier.

| Test Leg | Water Soluble Carrier | Dye Transfer Units After 1 Wash on CK No Graft Copolymer | Dye Transfer Units After Graft Copolymer 1K (see Table 2) |
|---|---|---|---|
| 3A | none | 4.3 (Reference) | — |
| 3B | PEG4000 | 3.3 (1 unit less dye transfer) | 1.5 |
| 3C | PEG8000 | 2.8 (1.5 units less dye transfer) | 1.6 |
| 3D | PEG12000 | 2.9 (1.4 units less dye transfer) | 1.4 |
| 3E | PEG20000 | 2.6 (1.7 units less dye transfer) | 1.4 |

Experiment 4 shows that a cohesive particle can be made from 1.4% to 22.8% graft copolymer by weight of the particle. When the same dose of the particle is delivered to the wash, the amount of dye transfer decreases with an increasing amount of graft copolymer in the particle when fabrics are washed according to the Dye Transfer Fabric Treatment Method in a Mini-washing Machine for 3 washes.

TABLE 5

Experiment 2. Less Dye Transfer with the Graft Copolymer in a Particle than in a Detergent.

| Test Leg | Detergent Composition | Water Soluble Carrier | 75 ppm Graft Copolymer Polymer | Dye Transfer Units After 3 Washes CK | Dye Transfer Units After 3 Washes NS | Improvement versus Reference (less dye transfer) CK | Improvement versus Reference (less dye transfer) NS |
|---|---|---|---|---|---|---|---|
| 2A | A | none | none | 8.1 | 9.3 | reference | reference |
| 2B | A | PEG8000 | none | 5.6 | 6.0 | 2.5 units less | 3.3 units less |
| 2C | B | none | detergent | 3.2 | 3.2 | 4.9 units less | 6.1 units less |
| 2D | A | PEG8000 | water soluble particle[a] | 2.7 | 2.7 | 5.4 units less | 6.6 units less |

[a]The graft copolymer 1K of Table 2 is formulated into the water soluble particle at 5.7% by weight (Example IV of Table 1).

a) The graft copolymer 1 K of Table 2 is formulated into the water soluble particle at 5.7% by weight (Exanoke IV of Table 1).

Experiment 3 shows the effect of the water soluble carrier molecular weight on dye transfer for particles having the graft copolymer compared to Detergent Composition A. The water soluble carriers used have a reported molecular weight of 4000 Da, 8000 Da, 12000 Da, and 20000 Da, and the graft copolymer is formulated at 5.7% by weight of the particle. The particle composition is added to the wash along with Table 7 shows that the graft copolymer in a particle decreases the dye transfer by 3.5 units relative to the detergent composition A with 1.4% graft copolymer in a particle (18 ppm graft copolymer delivered to the wash, Test Leg 4B) to 6.6 units less dye transfer when the particle contains 22.8% graft copolymer by weight (300 ppm graft copolymer delivered to the wash, Test Leg 4E). Thus, dye transfer with the graft copolymer in a water soluble particle decreases as the amount of graft copolymer added to the washing machine increases. This may be advantageous for the consumer to enable dosing of as much of the composition as needed based on the items in the load without having to add any unnecessary ingredients as would occur if the graft copolymer was formulated into a detergent and the consumer were to determine that more graft copolymer was desirable and increased the level by adding more detergent.

TABLE 7

Experiment 4. Dye Transfer Decreases with Increasing Amount of Graft Copolymer in the Particle.

| Test Leg | Detergent Composition | Water Soluble Carrier | % by Weight Graft Copolymer 1K (see Table 2) in Particle (ppm Delivered to the Wash) | Dye Transfer Units After 3 Washes on CK | Improvement vs Reference (less dye transfer) |
|---|---|---|---|---|---|
| 4A | A | none | none | 8.3 | reference |
| 4B | A | PEG8000 | 1.4% (18 ppm) | 4.8 | 3.5 units less |
| 4C | A | PEG8000 | 2.8% (36 ppm) | 3.8 | 4.5 units less |
| 4D | A | PEG8000 | 5.7% (75 ppm) | 3.2 | 5.1 units less |
| 4E | A | PEG8000 | 22.8% (300 ppm) | 1.7 | 6.6 units less |

Experiment 5 shows that the amount of dye transfer decreases by increasing the amount of particles added to the wash at the same polymer activity of 5.7% graft copolymer by weight of the particle when fabrics are washed according to the Dye Transfer Fabric Treatment Method in a Mini-washing Machine for 3 washes. Table 8 shows that the dye transfer can be reduced by 3.9 units by adding 3.7 g of particles (37 ppm delivered to the wash, Test Leg 5B) to 6.5 units less less dye transfer with 31.4 g of (316 ppm graft copolymer delivered to the wash, Test Leg 5E) versus the Detergent Composition A. Thus, increasing the amount of graft copolymer by increasing the amount of particles added to the wash decreases dye transfer.

TABLE 8

Experiment 5. Dye transfer Decreases with Increasing Amount of Particles Added to the Wash.

| Test Leg | Detergent Composition | Example IV with Graft Copolymer 1K (see Table 2) added to the wash (g) | Graft Copolymer 1K (see Table 2) Delivered to the Wash | Dye Transfer Units After 3 Washes on CK | Improvement vs Reference (Less Dye Transfer) |
|---|---|---|---|---|---|
| 5A | A | none | 0 | 8.1 | reference |
| 5B | A | 3.7 | 37 ppm | 4.2 | 3.9 units less |
| 5C | A | 7.4 | 74 ppm | 2.8 | 5.3 units less |
| 5D | A | 15.7 | 157 ppm | 1.9 | 6.2 units less |
| 5E | A | 31.4 | 316 ppm | 1.6 | 6.5 units less |

Experiment 6 shows that compositions of particles can be made containing the graft copolymer, a quaternary ammonium compound and cationic deposition aid.

TABLE 9

Experiment 6. Particles Containing the Graft Copolymer and Quaternary Ammonium Compound and a Cationic Polymer Deposition Aid.

| | % by Weight Graft Copolymer | | | | |
|---|---|---|---|---|---|
| Compositions | 6A | 6B | 6C | 6D | 6E |
| Water Soluble Carrier 1[a] | 100% | 94.3% | — | — | — |
| Water Soluble Carrier 2[b] | — | — | 95.0% | 67% | 62% |
| Quaternary Ammonium Compound[c] | — | — | — | 30% | 30% |
| Cationic Deposition Aid[d] | — | — | — | 3% | 3% |
| Graft Copolymer 1K (see Table 2) | — | 5.7% | 5.0% | — | 5% |
| Was a Cohesive Particle Made? | Yes | Yes | Yes | Yes | Yes |

[a]Poly(ethylene glycol) 8000 available from Sigma-Aldrich, product number 89510, molecular weight 7000-9000 Da.
[b]Water soluble carrier 2 is a 65/35 blend by weight of PLURIOL E8000 and PLURIOL E4000 available from BASF, Ludwigshafen, Germany.
[c]Quaternary ammonium compound is a blend of 80% by weight of C16-C18 Unsaturated DEEHMAMAS (Diethyl Ester Hydroxyethyl Methyl Ammonium Methyl Sulphate, Iodine Value 42 from EVONIK, Hopewell, VA and 20% by weight fatty acid having an Iodine Value of 0 (fatty acid is a blend of stearic acid and palmitic acid).
[d]SUPRACARE 150, a cationic hydroxyethyl cellulose having a weight average molecular weight of 400 kDa, a charge density of 0.18, and an average weight percent of nitrogen per repeat unit of 0.28% available from Dow Chemical, Midland, MI.

Experiment 7 shows that blending the graft copolymer with a quaternary ammonium compound and cationic deposition aid in a particle creates a water soluble particle that has a much faster cold-water dispersion time. When the graft copolymer is formulated with the quaternary ammonium compound and cationic deposition aid polymer (Test Leg 7B), the cold-water dispersion time decreases by about 12 min from 30.7 min in Test Leg 7A to 18.5 min in Test Leg 7B. As a comparison, the particle containing the graft copolymer has a cold-water dispersion time of 7.4 min (Test Leg 7C). Without wishing to be bound by theory, the quaternary ammonium compound is a hydrophobic waxy solid that is sparingly soluble in water and, although it can be formulated into a water dispersible particle, it takes a long time to disperse, particularly in cold water. Cold water dispersion is important since many consumers wash their colored clothes in cold water, and in some wash cycles, the wash time is short. Thus, combining the graft copolymer with quaternary ammonium compound and cationic polymer deposition aid can result in faster cold-water dispersion and can be more advantageous for delivering fabric care benefits.

TABLE 10

Experiment 7. Effect of the Graft Copolymer on the Cold-Water Dispersion Time for Particles containing Quaternary Ammonium Compound and a Cationic Deposition Aid (Composition 6D, 6E, and 6C, see Table 9).

| Test Leg | Composition | Cold-Water Dispersion Time at 25° C. | |
|---|---|---|---|
| 7A | 6D | 30.7 min | reference |
| 7B | 6E | 18.5 min | 12.2 min faster dissolution |
| 7C | 6C | 7.4 min | 23.3 min faster dissolution |

Experiment 8 shows the benefit of combining the graft copolymer particle, quaternary ammonium compound, and a cationic polymer deposition aid in a particle separate from the detergent composition in the same wash on maintaining the color of black denim according to the Method of Denim Fading in a Mini-Washing Machine. Table 11 shows the comparison of the L-value after the first wash and the L-value after ten washes, where a higher L-value is a lighter black. Black denim fabrics washed ten times with Detergent Composition A (Test Leg 8A) or the water soluble carrier Test Leg 8B or Detergent Composition B (Test Leg 8C) show a loss of 2.0-1.6 units of color and appear faded. Fabrics treated with particles containing the quaternary ammonium compound and cationic deposition aid (Test Let 8D) show a smaller loss in color with 0.6 units less color after ten washes. And when the graft copolymer particles are included with separate quaternary ammonium and cationic polymer deposition aid particles in Test Leg 8E, there is no measurable difference in the black denim between the first wash and the tenth wash. Without wishing to be bound by theory, the quaternary ammonium compound with the cationic polymer may deposit on the fabric and act as a lubricant to protect the fabric from abrasive damage, thereby maintaining the color. When the graft copolymer is also present in the wash liquor, the color maintenance is better. When the graft copolymer is used alone, there is some color loss (Test Leg 8C). Despite maintaining the black denim color by possibly lubricating the surface, an aspect of the cationic materials is that any dye that is released to the wash liquor that can transfer onto other fabrics in the load causing them to appear dingy and dull over time. As can be seen in Table 11, dye transfer onto cotton knit is worse when the quaternary ammonium compound and cationic polymer deposition beads in Leg 8D are used than detergent only (Leg 8A). However when the graft copolymer containing particles are added with the quaternary ammonium particles (Leg 8E), there is less dye transfer. Thus, the combination of the graft copolymer in particle and the quaternary ammonium compound with cationic deposition aid in separate particles results in better color maintenance and less dye transfer.

TABLE 11

Experiment 8. Results Showing the Color Change in Black Denim as Measured by the Change in L after 10 Washes in a Mini-Washing Machine.

| Test Leg | Detergent Composition | Water Soluble Particle | Graft Co-Polymer 1K (see Table 2) | Cationic Materials[a] | Black Denim Color Maintenance L After 1 wash | L After 10 washes | dL (wash 10-wash 1) | Dye Transfer Units After 1 wash on CK |
|---|---|---|---|---|---|---|---|---|
| 8A | A | none | none | none | 14.8 | 16.8 | 2.0 units lighter | 1.6 |
| 8B | A | 6A | none | none | 15.0 | 16.6 | 1.6 units lighter | 1.0 (0.6 units less) |
| 8C | B | none | 75 ppm | none | 14.7 | 16.5 | 1.8 units lighter | 1.3 (0.3 units less) |
| 8D | A | 6D | none | Yes | 14.7 | 15.3 | 0.6 units lighter | 3.8 (2.8 units more) |
| 8E | A | 6B and 6D[b] | 75 ppm | Yes | 14.7 | 14.8 | no difference | 3.1 (1.5 units more) |

aQuaternary ammonium compound and cationic polymer deposition aid according to the compositions shown in Table 9.
[b]7.4 g of particle D (see Table 9).

a) Quaternary ammonium compound and cationic polymer desposition aid according to the compositions shown in Table 9.
b) 7.4 g of particle D (see Table 9).

Examples/Combinations

An example is below:

A. A composition comprising a plurality of particles, wherein said particles comprise:
  about 25% to about 99% by weight a water soluble carrier; and
  about 1% to about 75% by weight a graft copolymer;
  wherein said graft copolymer comprises:
  (a) a polyalkylene oxide which has a number average molecular weight of from about 1000 to about 20000 Da and is based on ethylene oxide, propylene oxide, or butylene oxide;
  (b) a N-vinylpyrrolidone; and
  (c) a vinyl ester derived from a saturated monocarboxylic acid containing from 1 to 6 carbon atoms;
  wherein (a) and (b) are present at a weight ratio of (a):(b) of from about 1:0.1 to about 1:1;
  wherein by weight, (a) is present in an amount greater than (c);
  wherein order of addition of (b) and (c) in graft polymerization is immaterial; and
  wherein each of said particles has a mass from about 1 mg to about 1 g.

B. The composition according to Paragraph A, wherein said polyalkylene oxide is based on ethylene oxide.

C. The composition according to Paragraph A or B, wherein said vinyl ester is derived from a saturated monocarboxylic acid containing from 1 to 3 carbon atoms.

D. The composition according to Paragraph A or B, wherein said vinyl ester is vinyl acetate or a derivative thereof.

E. The composition according to any of Paragraphs A to D, wherein (a) and (b) are present at a weight ratio of (a):(b) of from about 1:0.2 to about 1:0.7.

F. The composition according to any of Paragraphs A to E, wherein (a) and (c) are present at a weight ratio of (a):(c) of from about 1:0.1 to about 1:0.8.

G. The composition according to any of Paragraphs A to F, wherein (b) and (c) are present at a weight ratio of (b):(c) of from about 1:0.1 to about 1:4.

H. The composition according to any of Paragraphs A to G, wherein from about 1 mol % to about 60 mol % of (c) is hydrolyzed.

I. The composition according to any of Paragraphs A to H, wherein the number of grafting sites of the graft copolymer is equal to or less than about 1 per 50 ethylene oxide groups.

J. The composition according to any of Paragraphs A to I, wherein said water soluble carrier is selected from the group consisting of polyalkylene oxide, polyethylene glycol, sodium acetate, sodium bicarbonate, sodium chloride, sodium silicate, polypropylene glycol, polyethylene glycol-co-polypropylene glycol, polyglycerol esters, polyoxoalkylene, polyethylene glycol fatty acid ester, polyethylene glycol ether, polyglycerol esters, sodium sulfate, carbohydrates, starch, and mixtures thereof, optionally polyethylene glycol having a weight average molecular weight from about 2000 to about 20000 Da.

K. The composition according to any of Paragraphs A to J, wherein said composition further comprises a component selected from the group consisting of quaternary ammonium compound, cationic polymer, fatty acid, acid, unencapsulated perfume, encapsulated perfume, enzyme, and combinations thereof.

L. The composition according to Paragraph K, wherein said particles comprise one or more of said components.

M. The composition according to Paragraph K, wherein said composition further comprises adjunct particles and one or more of said components is provided in said adjunct particles.

N. The composition according to any of Paragraphs A to M, wherein said particles comprise:
   about 25% to about 99%, optionally about 35% to about 99%, by weight a water soluble carrier, wherein said water soluble carrier is a water soluble polymer;
   about 1% to about 30% by weight a graft copolymer;
   wherein said composition optionally comprises from about 5% to about 45% by weight quaternary ammonium compound; and
   wherein said composition optionally comprises from about 0.5% to about 10% by weight cationic polymer.

O. The composition according to any of Paragraphs A to N, wherein said particles are less than about 10% by weight water.

P. The composition according to any of Paragraphs A to O, wherein said composition further comprises about 5% to about 45% by weight a quaternary ammonium compound, optionally quaternary ammonium compound formed from a parent fatty acid compound having an Iodine Value from about 18 to about 60.

Q. The composition according to Paragraph P, wherein said particles comprise said quaternary ammonium compound.

R. The composition according to Paragraph P, wherein said composition comprises adjunct particles, wherein said adjunct particles comprise said quaternary ammonium compound.

S. The composition according to Paragraph R, wherein said adjunct particles comprise from about 30% to about 94% by weight a water soluble carrier.

T. The composition according to any of Paragraphs A to S, wherein said composition further comprises from about 0.5% to about 10% by weight cationic polymer.

U. The composition according to Paragraph T, wherein said particles comprise said cationic polymer.

V. The composition according to Paragraph T, wherein said composition comprises adjunct particles, wherein said adjunct particles comprise said cationic polymer.

W. The composition according to any of Paragraphs T to V, wherein said cationic polymer is selected from the group consisting of cationic polysaccharide, polyquaternium-4, polyquaternium-6, polyquaternium-7, polyquaternium-10, polyquaternium-22, polyquaternium-67, and mixtures thereof.

X. The composition according to any of Paragraphs T to V, wherein said cationic polymer is a cationic polysaccharide.

Y. The composition according to any of Paragraphs A to X, wherein said water soluble carrier comprises polyethylene glycol having a weight average molecular weight from about 2000 to about 13000 Da.

Z. The composition according to any of Paragraphs A to Y, wherein said composition further comprises acid.

AA. The composition according to Paragraph Z, wherein said particles comprise said acid.

BB. The composition according to Paragraph Z, wherein said composition comprises adjunct particles, wherein said adjunct particles comprise said acid.

CC. The composition according to any of Paragraphs A to BB, wherein said composition further comprises perfume, optionally said perfume is one or both of unencapsulated perfume and encapsulated perfume.

DD. The composition according to Paragraph CC, wherein said particles comprise said perfume.

EE. The composition according to Paragraph CC, wherein said composition comprises adjunct particles, wherein said adjunct particles comprise said perfume, optionally said perfume is one or both of unencapsulated perfume and encapsulated perfume.

FF. The composition according to any of Paragraphs A to EE, wherein said composition further comprises an enzyme.

GG. The composition according to Paragraph FF, wherein said particles comprise said enzyme.

HH. The composition according to Paragraph FF, wherein said composition comprises adjunct particles, wherein said adjunct particles comprise said enzyme.

II. The composition according to any of Paragraphs FF to HH, wherein said enzyme is selected from the group consisting of protease, xyloglucanase, mannanase, and combinations thereof.

JJ. The composition according to any of Paragraphs A to II, wherein said vinyl ester is selected from the group consisting of vinyl formate, vinyl acetate, vinyl propionate, vinyl butyrate, vinyl valerate, vinyl iso-valerate, vinyl caproate, or mixtures thereof.

KK. A process for treating laundry with the composition according to any of Paragraphs A to JJ comprising the steps of:
   providing laundry in a washing machine;
   dispensing said composition into said washing machine;
   contacting said laundry with water;
   dissolving said composition in said water to form a laundry treatment liquor; and contacting said laundry with said laundry treatment liquor.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising a plurality of particles, wherein said particles comprise:

about 25% to about 99% by weight a water soluble carrier; and about 1% to about 75% by weight a graft copolymer;

wherein said graft copolymer comprises:

(a) a polyalkylene oxide which has a number average molecular weight of from about 1000 to about 20000 Da and is based on ethylene oxide, propylene oxide, or butylene oxide;

(b) a N-vinylpyrrolidone; and (c) a vinyl ester derived from a saturated monocarboxylic acid containing from 1 to 6 carbon atoms;

wherein (a) and (b) are present at a weight ratio of (a):(b) of from about 1:0.1 to about 1:1;

wherein by weight, (a) is present in an amount greater than (c);

wherein order of addition of (b) and (c) in graft polymerization is immaterial;

wherein the number of grafting sites of the graft copolymer is equal to or less than about 1 per 50 alkylene oxide groups; and wherein each of said particles has a mass from about 1 mg to about 1 g.

2. The composition according to claim 1, wherein said composition further comprises about 5% to about 45% by weight a quaternary ammonium compound.

3. The composition according to claim 2, wherein said composition further comprises from about 0.5% to about 10% by weight cationic polymer.

4. The composition according to claim 3, wherein said particles further comprise said quaternary ammonium compound.

5. The composition according to claim 3, wherein said cationic polymer is selected from the group consisting of cationic polysaccharide, Polyquaternium-4, Polyquaternium-6, Polyquaternium-7, Polyquaternium-10, Polyquaternium-22, Polyquaternium-67, and mixtures thereof.

6. The composition according to claim 1, wherein the number of grafting sites of the graft copolymer is equal to or less than about 0.4 per 50 alkylene oxide groups.

7. The composition according to claim 1, wherein said particles further comprise acid.

8. The composition according to claim 1, wherein said particles further comprise perfume.

9. The composition according to claim 1, wherein said composition comprises adjunct particles, wherein said adjunct particles comprise perfume.

10. The composition according to claim 1, wherein said composition further comprises an enzyme.

11. The composition according to claim 1, wherein said composition comprises adjunct particles, wherein said adjunct particles comprise an enzyme.

12. The composition according to claim 1, wherein said polyalkylene oxide is based on ethylene oxide.

13. The composition according to claim 1, wherein said vinyl ester is derived from a saturated monocarboxylic acid containing from 1 to 3 carbon atoms.

14. The composition according to claim 1, wherein said vinyl ester is vinyl acetate or a derivative thereof.

15. The composition according to claim 1, wherein (a) and (b) are present at a weight ratio of (a): (b) of from about 1:0.2 to about 1:0.7.

16. The composition according to claim 1, wherein (a) and (c) are present at a weight ratio of (a): (c) of from about 1:0.1 to about 1:0.8.

17. The composition according to claim 1, wherein (b) and (c) are present at a weight ratio of (b): (c) of from about 1:0.1 to about 1:4.

18. The composition according to claim 1, wherein from about 1 mol % to about 60 mol % of (c) is hydrolyzed.

19. The composition according to claim 1 wherein said water soluble carrier is selected from the group consisting of polyalkylene oxide, polyethylene glycol, sodium acetate, sodium bicarbonate, sodium chloride, sodium silicate, polypropylene glycol, polyethylene glycol-co-polypropylene glycol, polyglycerol esters, polyoxoalkylene, polyethylene glycol fatty acid ester, polyethylene glycol ether, sodium sulfate, carbohydrates, starch, and mixtures thereof.

20. A process for treating laundry with the composition of claim 1 comprising the steps of:

providing laundry in a washing machine;

dispensing said composition into said washing machine;

contacting said laundry with water;

dissolving said composition in said water to form a laundry treatment liquor; and contacting said laundry with said laundry treatment liquor.

* * * * *